(12) United States Patent
Iida et al.

(10) Patent No.: US 6,862,875 B2
(45) Date of Patent: Mar. 8, 2005

(54) LAWN MOWER GUIDE AND DISCHARGE

(75) Inventors: Tetsuo Iida, Wako (JP); Takao Kobayashi, Wako (JP); Hiromitsu Sasaki, Wako (JP); Kenzo Shimada, Wako (JP); Masanori Shin, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/378,755

(22) Filed: Mar. 4, 2003

(65) Prior Publication Data

US 2003/0182916 A1 Oct. 2, 2003

(30) Foreign Application Priority Data

Mar. 26, 2002 (JP) ................................ 2002-087057
Nov. 8, 2002 (JP) ................................ 2002-325846

(51) Int. Cl.[7] .............................................. A01D 67/00
(52) U.S. Cl. .................................................. 56/320.2
(58) Field of Search ......................... 56/320.2, 320.1, 56/17.4, 16.6, 202, 203, 255, 295, DIG. 17, DIG. 20

(56) References Cited

U.S. PATENT DOCUMENTS

| | | | | |
|---|---|---|---|---|
| 3,134,212 A | * | 5/1964 | Gary ........................ 56/16.4 R |
| 3,893,284 A | * | 7/1975 | Thon et al. .................... 56/202 |
| 3,949,540 A | * | 4/1976 | Christopherson et al. ...... 56/202 |
| 4,214,424 A | * | 7/1980 | Gobin .......................... 56/202 |
| 4,312,174 A | * | 1/1982 | Vanderhoef ................. 56/320.2 |
| 4,435,949 A | * | 3/1984 | Heismann ................... 56/320.2 |
| 4,800,712 A | * | 1/1989 | Morse et al. .................. 56/202 |
| 4,951,449 A | | 8/1990 | Thorud ............................ 56/2 |
| 5,033,260 A | * | 7/1991 | Jerry ......................... 56/320.2 |
| 5,210,998 A | | 5/1993 | Hojo et al. .................... 56/255 |
| 5,488,821 A | * | 2/1996 | McCunn et al. ........... 56/320.2 |
| 5,894,717 A | * | 4/1999 | Yamashita et al. ......... 56/320.1 |
| 6,195,969 B1 | | 3/2001 | Yilmaz ....................... 56/14.7 |

FOREIGN PATENT DOCUMENTS

| | | |
|---|---|---|
| JP | 643441 | 1/1989 |
| WO | 9410827 | 5/1994 |

* cited by examiner

*Primary Examiner*—Arpad Fabian Kovacs
(74) *Attorney, Agent, or Firm*—Adams & Wilks

(57) ABSTRACT

A lawn mower has a power source for rotationally driving an output shaft. A housing has an interior space having a generally spiral-shaped portion. A cutting blade is disposed in the interior space of the housing and is connected to the output shaft for rotation therewith to cut grass while the spiral-shaped portion of the interior space generates a swirling airflow allowing the cut grass to swirl within the interior space. An enclosure is connected to the housing and has a grass discharge passage having an inlet opening disposed in communication with the interior space of the housing for discharging grass cut by the cutting blade and swirling within the interior space of the housing. A guiding member is disposed in the interior space of the housing for gradually changing a direction of the swirling airflow and the swirling cut grass and for guiding the swirling airflow and the swirling cut grass toward the grass discharge passage of the enclosure.

3 Claims, 21 Drawing Sheets

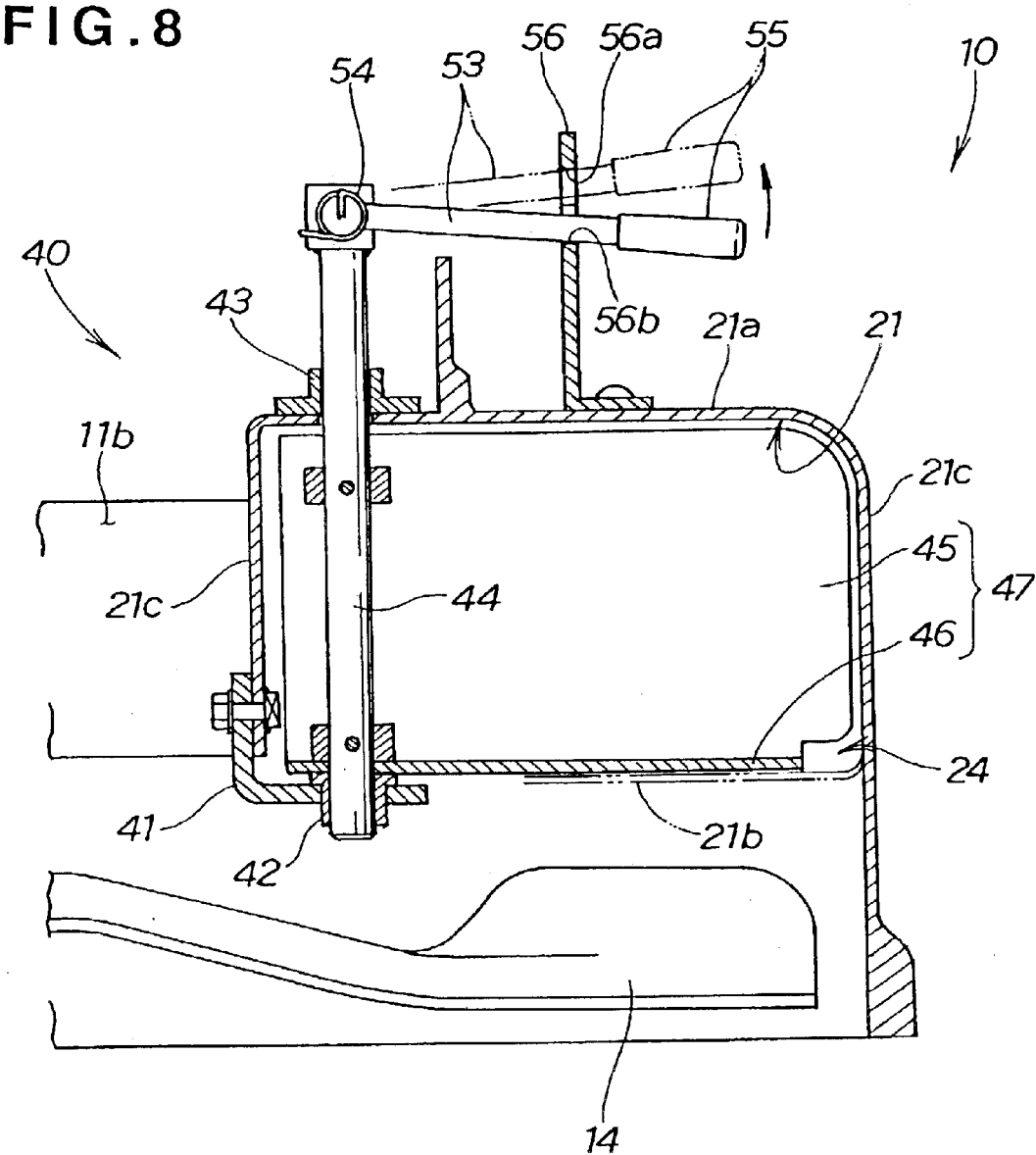

LAWN MOWER GUIDE AND DISCHARGE

BACKGROUND OF THE INVENTION

1. Field of the Invention

The present invention relates to lawn mowers, and more particularly, to rotary lawn mowers for cutting grass by rotating along the grass cutting blades housed in housings opening downward.

2. Background Information

Conventional rotary lawn mowers include (1) lawn mowers of a type for use in a so-called bagging mode for receiving grass cut by cutting blades in grass receptacles such as bags and (2) lawn mowers of a type for use in a so-called mulching mode for cutting grass cut by cutting blades more finely within housings and discharging it downward of the housings. The lawn mowers (1) can remove all cut grass (grass clippings), providing a good finish of the cut grass, and are thus commonly used in golf courses or the like. The lawn mowers (2) can eliminate the need for the work of "dumping grass clippings" by returning grass clippings to the lawns, and are thus commonly used in parks or the like.

It is, however, inconvenient to selectively use the two types of lawn mowers for their respective suitable uses. In recent years, an art of allowing a single lawn mower to serve both as (1) and as (2) has been developed (e.g., Japanese Patent Laid-Open Publication No. SHO-64-3441 and U.S. Pat. No. 4,951,449).

SHO-64-3441 discloses that a grass discharge chute can be mounted on a top plate of a housing to set it as a bagging-mode housing. With this structure, a bag is attached to an outlet of the grass discharge chute so that grass cut by a cutting blade can be received in the bag (bagging mode).

The lawn mower of SHO-64-3441 can also remove the grass discharge chute and mount a cover plate on the top plate of the housing to switch it into a mulching-mode housing. With this structure, grass cut by the cutting blade can be discharged downward of the housing (mulching mode).

A lawn mower of U.S. Pat. No. 4,951,449 has a bagging-mode housing with a grass discharge chute extended rearward and upward from its top plate. The bagging-mode housing has a scroll portion for allowing grass cut by a cutting blade to swirl within the housing while directing it to the grass discharge chute. A chute plug blocking the grass discharge chute can be removed to attach a bag to the grass discharge chute, thereby to receive grass cut by the cutting blade in the bag (bagging mode).

The lawn mower of U.S. Pat. No. 4,951,449 can also block the grass discharge chute with the chute plug to discharge grass cut by the cutting blade downward of the bagging-mode housing (mulching mode).

The lawn mower of SHO-64-3441 is switched between the bagging-mode housing and the mulching-mode housing by manually changing parts. The switching every time requires manual change of parts, inefficiently involving troublesome changing work.

The lawn mower of U.S. Pat. No. 4,951,449 can switch the bagging-mode housing between the bagging mode and the mulching mode only by mounting or demounting the chute plug to or from the grass discharge chute. The mode switching operation is thus relatively easy.

However, the bagging-mode housing is also used in the mulching mode without change. The bagging-mode housing has, as described above, the scroll portion for allowing grass (grass clippings) cut by the cutting blade to swirl within the housing while directing it to the grass discharge chute.

In the mulching mode, grass clippings are cut more finely by the cutting blade while being caused to swirl within the housing, to be discharged downward of the housing. The cross-sectional area of the housing is larger at a portion where the scroll portion lies and smaller at a portion without the scroll portion. The flow velocity of an air flow swirling grass clippings within the housing, that is, a swirling flow can thus be largely changed between the portion with the scroll portion and the portion without the scroll portion. The rapid change of the flow velocity of a swirling flow can be a factor of the retention of grass clippings within the housing.

If the flow velocity is rapidly reduced near the rear end of the scroll portion, for example, grass clippings accumulate on the inner surface of the housing at that portion, or grass clippings accumulate at the inlet of the grass discharge chute. A certain amount of accumulation with the housing reduces the flow of a swirling flow. Suspending the grass cutting operation each time it occurs and removing accumulating grass clippings prevent continuous operations. The resulting operating inefficiency leaves room for improvement.

Furthermore, partial accumulation of grass clippings within the housing prevents grass clippings to be evenly discharged downward from the housing. The return amount of grass clippings returned from the housing to the lawn is thus nonuniform, resulting in a reduced finished quality of the grass cutting.

Thus, desired is a lawn mower which increases operating efficiency in a mulching mode while securing operating efficiency in a bagging mode, improving the finished quality of grass cutting.

SUMMARY OF THE INVENTION

According to the present invention, there is provided a lawn mower, which comprises: a power source with an output shaft extending downward; a housing provided below the power source, opening downward; a cutting blade housed in the housing and attached to the output shaft; a grass discharge passage extending rearward and upward from the housing; a member provided in the grass discharge passage for opening and blocking the passage; a grass receptacle removably mounted to an outlet of the grass discharge passage; a scroll portion provided in the housing for allowing grass cut by the cutting blade to swirl within the housing while guiding it to the grass discharge passage; and a guide provided along the scroll portion beneath a top plate of the housing; wherein, when the grass discharge passage is opened, grass cut by the cutting blade is received through the grass discharge passage in the grass receptacle; when the grass discharge passage is blocked, grass cut by the cutting blade is discharged downward of the housing; and a rear guide end of the guide is opposed to a passage opening facing the housing of the grass discharge passage.

Specifically, in the present invention, the guide is placed along the scroll portion for allowing grass clippings to swirl within the bagging-mode housing while directing them toward the grass discharge passage, the guide being provided beneath the top plate of the housing, and the rear guide end of the guide is opposed to the passage opening facing the housing of the grass discharge passage, so that the direction of an air flow swirling grass clippings within the housing, that is, a swirling flow can be gradually changed and guided toward the passage opening with the guide.

Furthermore, since the guide placed along the scroll is provided beneath the top plate of the bagging-mode housing, the cross-sectional area of the housing can be gradually changed between a portion with the scroll portion and a portion without the scroll portion. The gradual change of the cross-sectional area results in a gradual change of the flow velocity of a swirling flow between the portion with the scroll portion and the portion without the scroll portion. Thus in the mulching mode in which the grass discharge passage is blocked off, a swirling flow guided by the guide smoothly continues swirling within the housing. Grass clippings thus hardly accumulate within the housing. No accumulation of grass clippings allows continuous grass cutting operations. This results in an increased efficiency in mulching-mode operations. Further, grass clippings can be discharged evenly downward from the housing. The return amount of grass clippings returned from the housing to the lawn is thus uniform, improving the finished quality of the grass cutting.

In the bagging mode in which the grass discharge passage is opened, a swirling flow (carrying flow) guided by the guide flows from the passage opening into the grass discharge passage to discharge grass clippings into the grass receptacle. The operating efficiency in the bagging mode can be secured.

In this manner, the operating efficiency in the mulching mode can be improved with the operating efficiency in the bagging mode being secured, improving the finished quality of grass cutting.

The rear guide end of the guide is preferably generally oriented toward the bottom of the passage opening. Thus generally orienting the rear guide end of the guide toward the bottom of the passage opening allows the flow direction of a swirling flow to be gradually changed and guided below the passage opening. The cross-sectional area of the housing can thus be more gradually changed between the portion with the scroll portion and the portion without the scroll portion. The more gradual change in the cross-sectional area results in a more gradual change in the flow velocity of the swirling flow between the portion with the scroll portion and the portion without the scroll portion. As a result, in the mulching mode, a swirling flow guided by the guide more smoothly continues swirling within the housing. Local accumulation of grass clippings within the housing can thus be further prevented. More continuous grass cutting operations can thus be performed, further increasing operating efficiency in the mulching mode. Also the return mount of grass clippings returned from the housing to the lawn can be more evened, further improving the finished quality of the grass cutting, The member for opening and blocking the grass discharge passage is preferably a plug member to be removed out of or inserted into the grass discharge passage. The plug member extends toward the rear guide end of the guide within the housing, with the bottom of the plug member being placed at a height substantially identical to that of the rear guide end. Only removing or inserting the plug member out of or into the grass discharge passage allows the bagging-mode housing to be switched between the bagging mode and the mulching mode. The mode switching operation is easy and allows short-time switching. The lower end of the plug member extended toward the rear guide end of the guide is placed at a height substantially identical to that of the rear guide end, so that a swirling flow guided by the guide passes below the plug member in the mulching mode with the grass discharge passage blocked by the plug member. In this manner, a swirling flow guided by the guide can be further gradually changed and guided toward the portion without the scroll portion by the lower end of the plug member. The cross-sectional area of the housing can thus be more gradually changed between the portion with the scroll portion and the portion without the scroll portion. The more gradual change in cross-sectional area results in a more gradual change in the flow velocity of a swirling flow between the portion with the scroll portion and the portion without the scroll portion. As a result, in the mulching mode, a swirling flow guided by the guide more smoothly continues swirling within the housing. Grass clippings can thus be further prevented from locally accumulating within the housing.

The member for opening and blocking the grass discharge passage may be a shutter provided to the passage opening of the grass discharge passage. The shutter comprises: a rotary shaft extending vertically and provided in the vicinity of the passage opening, adjacent one of left and right vertical walls of the grass discharge passage; a vertical shield of a vertical plate attached at a swing proximal end thereof to the rotary shaft for opening and closing the passage opening by swinging operation; a horizontal shield of a horizontal plate extending from the bottom of the vertical shield toward the outlet for blocking a lower portion of the passage opening; and a control lever coupled to the rotary shaft; the control lever being operated to adjust the degree of opening of the passage opening via the vertical shield and the horizontal shield. The degree of opening of the passage opening can thus be desirably and easily adjusted by the shutter. That is, the simple shutter opening control allows switching between the bagging mode in which the shutter is fully opened to receive grass clippings in the grass receptacle, the mulching mode in which the shutter is fully closed to discharge grass clippings downward of the housing, and the intermediate mode between the bagging mode and the mulching mode in which the shutter is opened to a desired degree. It is needless to change parts every time the mode is switched. Further, opening the shutter to a desired degree allows minute and preferable setting of the form of discharge of grass clippings according to lawn conditions, required finished quality, or preference.

The rear guide end of the guide is preferably placed higher in level than the bottom of the passage opening. The rear guide end is preferably formed in a wave shape.

Lawn mowers for use in a bagging mode generally cause grass cut by cutting blades to swirl within housings while guiding it to grass discharge passages. The shape of the bagging-mode housings is thus generally spiral.

Lawn mowers for use in a mulching mode cut grass cut by cutting blades more finely by the cutting blades within housings. The shape of the mulching-mode housings is thus generally uniform in cross-sectional shape.

The shape of the housings for use in a bagging mode is thus different from the shape of the housings for use in a mulching mode.

The lawn mower of the present invention uses the single housing to operate in the bagging mode, mulching mode and intermediate mode, having the scroll portion in the housing for efficiently performing bagging-mode operations. The guide is placed along the scroll portion, being provided beneath the top plate of the housing, and the rear guide end of the guide is opposed to the passage opening, for efficiently performing mulching-mode operations.

When the shutter is opened, the scroll portion and the guide allow grass clippings to swirl while smoothly guiding them to the passage opening. When the shutter is closed, the guide guides grass clippings swirling in the scroll portion for smooth flow along the closed shutter. The same applies to the intermediate mode. With the single housing, operations in the bagging mode, mulching mode and intermediate mode can thus be more efficiently performed.

In the present invention, as described above, the height of the rear guide end of the guide is set greater than that of the bottom of the passage opening. Thus in the intermediate mode, grass clippings swirling along the guide can be easily taken into the grass discharge passage. As a result, a required amount of grass clippings can be securely received through the grass discharge passage in the grass receptacle. The ratio between the amount of glass clippings to be received in the grass receptacle and the amount of grass clippings to be discharged downward of the housing can thus be relatively precisely set in the intermediate mode. The workability in the intermediate mode can be further improved.

When the cutting blade is rotated, an air flow (swirling flow) along the guide is produced below the guide. This flow tends to become a vortex flow at the rear guide end. When the vortex flow is excessive, grass clippings are likely to be drawn into the vortex flow. As a result, in the bagging mode or the intermediate mode, the grass clippings have difficulty in flowing into the passage opening.

In the present invention, as described above, the rear guide end of the guide has a wave shape. Thus air flows at depressions in the wave shape interfere with air flows at projections to reduce the generation of vortex flows, resulting in a straightened air flow flowing into the passage opening. As a result, in the bagging mode or the intermediate mode, grass clippings easily flow into the passage opening. Grass clippings are thus allowed to smoothly flow into the grass receptacle through the grass discharge passage to be more securely received.

BRIEF DESCRIPTION OF THE DRAWINGS

Preferred embodiments of the present invention will be described in detail below, by way of example only, with reference to the accompanying drawings, in which:

FIG. 8 is an enlarged cross-sectional view taken along line 8—8 in FIG. 3;

DETAILED DESCRIPTION OF THE PREFERRED EMBODIMENTS

Initial reference is made to FIGS. 1 to 15 illustrating a first embodiment of a lawn mower of the present invention.

Figure 1:
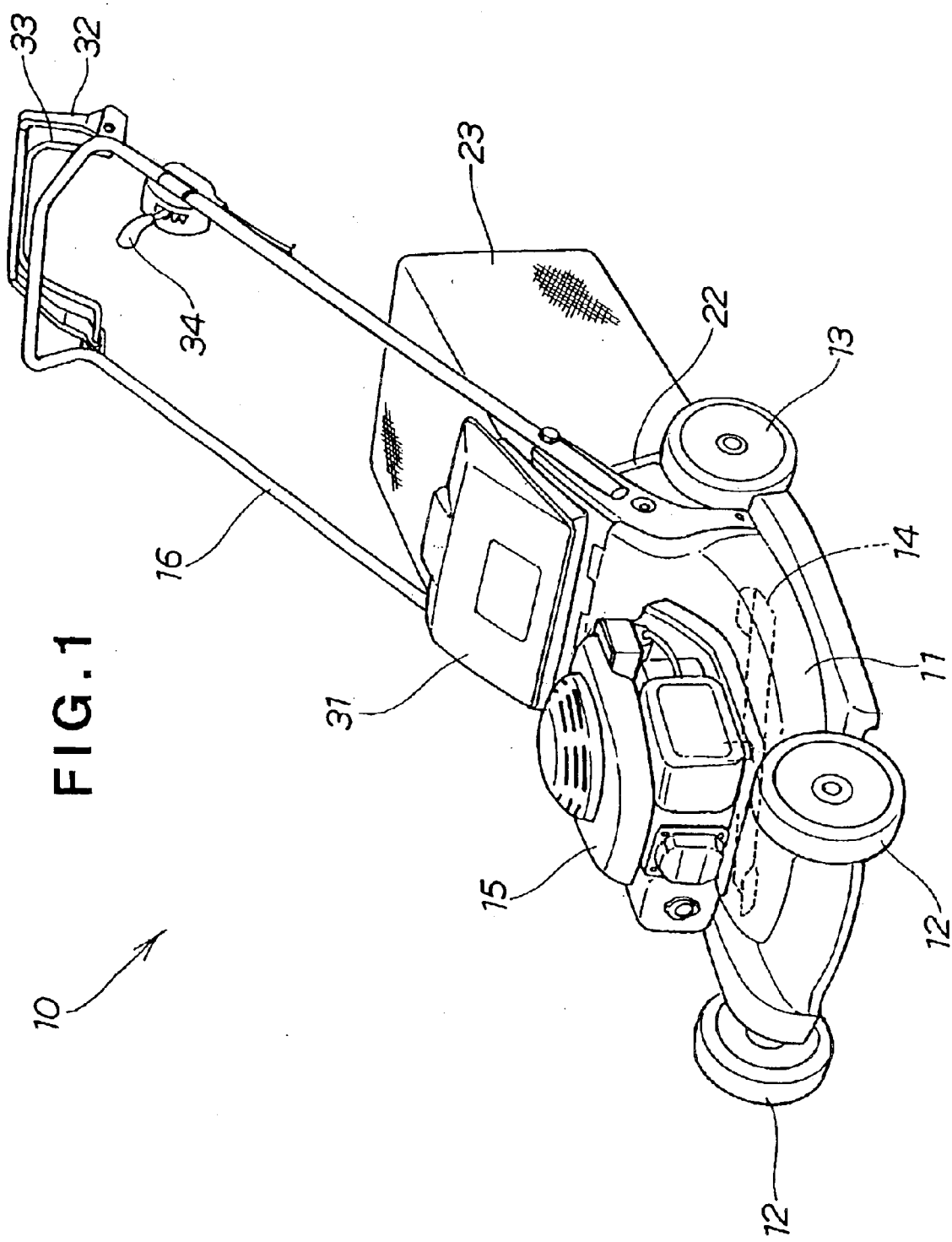
FIG. 1 is a perspective view of a lawn mower according to a first embodiment of the present invention.

In FIG. 1, a lawn mower 10 of this embodiment has a housing 11 as a body, left and right front wheels 12, 12 provided at the front of the housing 11, and left and right rear wheels 13, 13 as driving wheels provided at the rear of the housing 11 (Only the left ones of the left and right ones are shown in the figure.). The lawn mower 10 further has a single grass cutting blade 14 provided in a central portion within the housing 11, an engine 15 provided on the top of the housing 11 for driving the rear wheels 13, 13 and the cutting blade 14, and a continuously variable transmission (not shown) interposed between the engine 15 and the rear wheels 13, 13 within the rear of the housing 11. An operating handle 16 extends rearward from the housing 11. The lawn mower 10 is a walk-behind self-propelled working machine.

Figure 2:
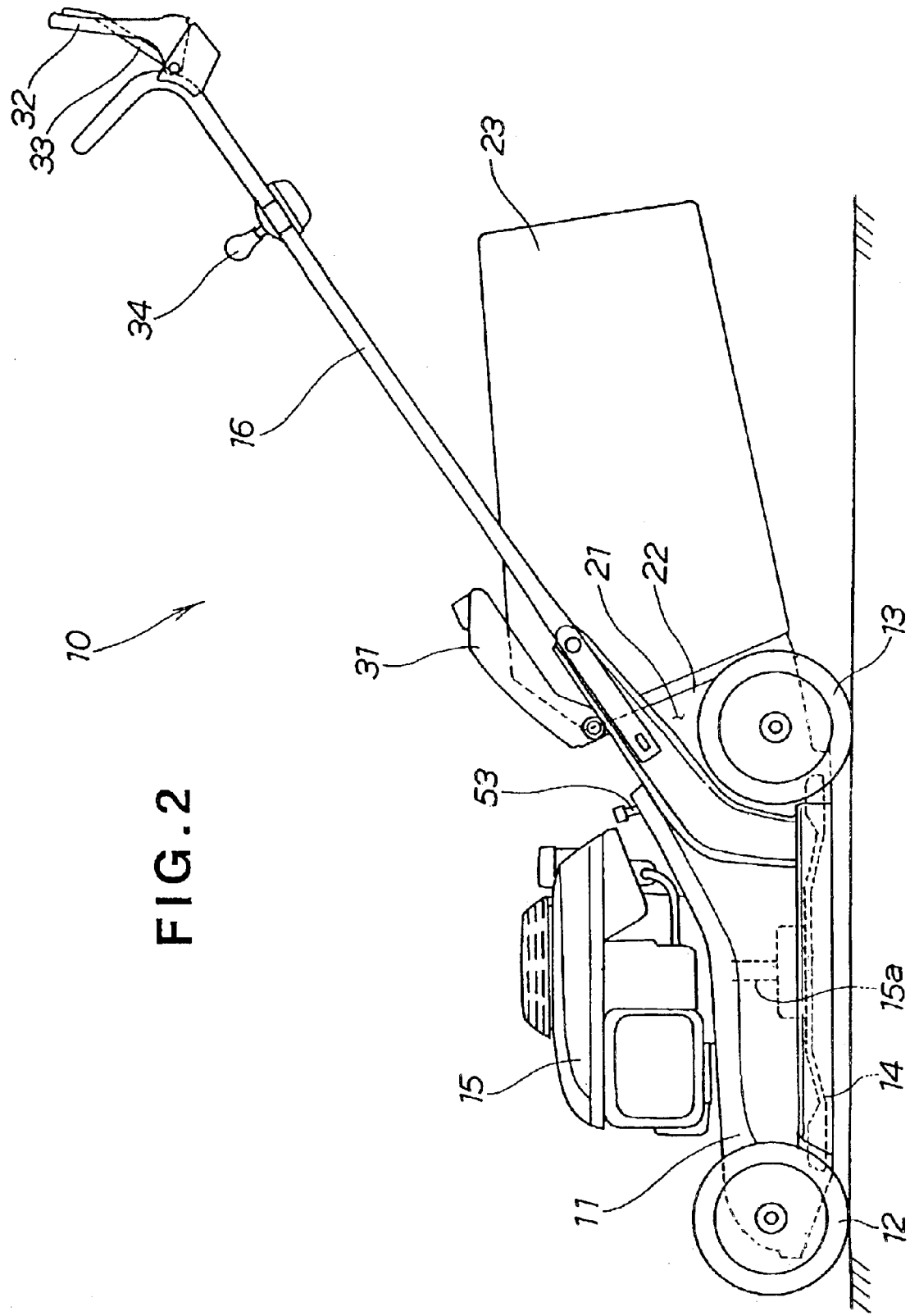
FIG. 2 is a left side view of the lawn mower shown in FIG. 1.

As shown in FIG. 2, an output shaft 15a extends downward from the engine 15 as a power source. Below the engine 15 is provided the housing 11 opening downward. The cutting blade 14 housed in the housing 11 is attached to the output shaft 15a. A grass discharge passage 21 with a substantially rectangular cross section extends from the housing 11 rearward and upward. At an outlet of the grass discharge passage 21 is provided a receptacle mounted portion 22. A grass receptacle 23 such as a grass bag is removably mounted to the receptacle mounted portion 22 (that is, to the outlet of the grass discharge passage 21) so as to receive grass cut by the cutting blade 14 (hereinafter referred to as "grass clippings") through the grass discharge passage 21 in the grass receptacle 23.

A receptacle cover 31 is attached to a rear upper portion of the housing 11 in an upwardly and downwardly swingable manner. A cutting blade clutch lever 32, a drive clutch lever 33 and a speed change lever 34 are provided on the operating handle 16.

Figure 3:
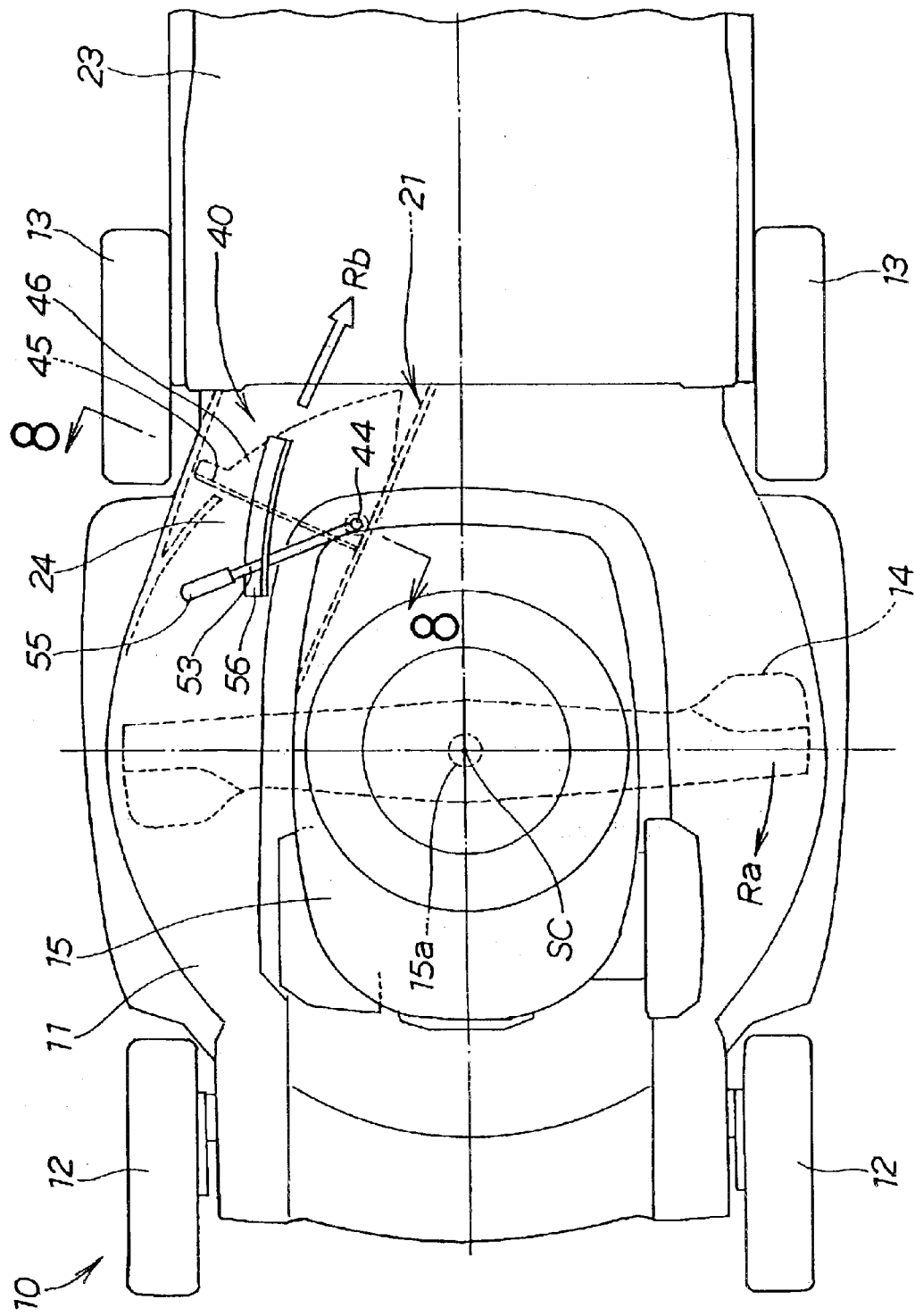
FIG. 3 is an enlarged plan view of the lawn mower shown in FIG. 2.

As shown in FIG. 3, the cutting blade 14 rotates in a clockwise direction as shown by an arrow Ra to cut grass and also to produce an air flow as shown by a hollow arrow Rb, that is, a swirling flow (carrying flow) within the housing 11, transmitting grass clippings into the grass receptacle 23. The lawn mower 10 is self-propelled forward to proceed with the grass cutting operation.

Figure 4:
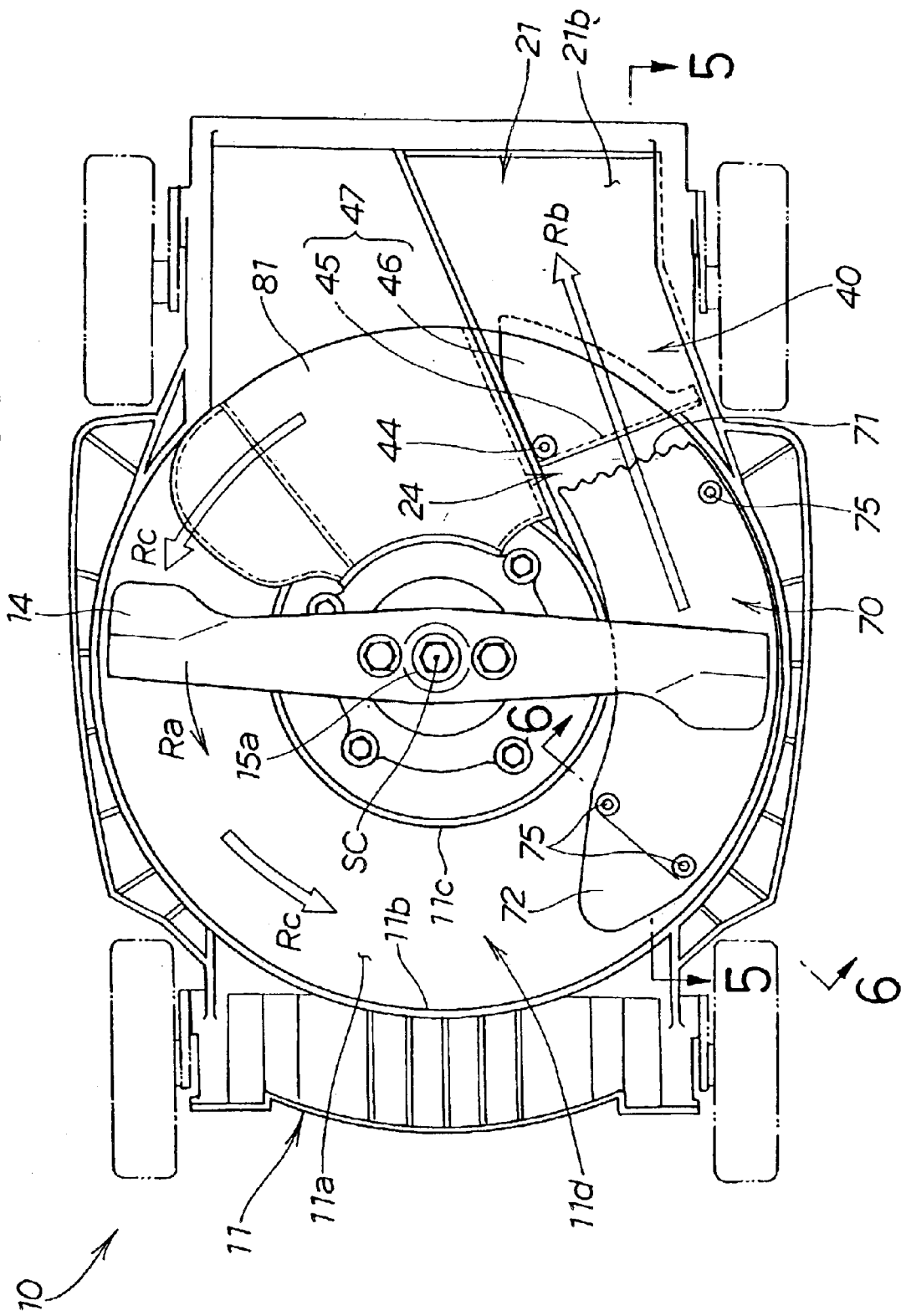
FIG. 4 is an enlarged bottom view of the lawn mower shown in FIG. 2.

As shown in FIG. 4, the lawn mower 10 of this embodiment is characterized in that a shutter 40 is provided to a passage opening 24 facing the housing 11 of the grass discharge passage 21 so that the degree of opening of the passage opening 24 is adjusted with the shutter 40. That is, the shutter 40 is a member for opening and blocking the grass discharge passage 21.

The housing 11 is a spiral case or scroll case with a scroll portion 11d, that is, a bagging-mode housing for allowing grass clippings to swirl within the housing while directing them to the grass discharge passage 21 as shown by the hollow arrow Rb.

More specifically, the housing 11 has an outer tubular portion 11b and an inner tubular portion 11c with a diameter smaller than that of the outer tubular portion 11b, which are cylindrical in shape, being disposed concentrically with the shaft center SC of the output shaft 15a. The grass discharge passage 21 is extended rearward from the outer tubular portion 11b, tangentially to the outer tubular portion 11b.

The scroll portion 11d is a space enclosed by a top plate 11a, the outer tubular portion 11b and the inner tubular portion 11c, communicating with the passage opening 24 facing the housing 11 of the grass discharge passage 21.

The housing 11 allows glass clippings to sufficiently swirl with a swirling flow within the housing 11 as shown by hollow arrows Rc, to provide an efficient mulching-mode operation.

More specifically, a guide 70 is placed along the scroll portion 11d, being provided beneath the top plate 11a of the housing 11, and a rear guide end 71 of the guide 70 is oriented to face (that is, opposed to) the passage opening 24.

Reference numeral 72 denotes a front guide portion of the guide 70, and 81 a scroll plate.

As is also apparent from FIG. 4, the lawn mower 10 allows the guide 70 and the scroll plate 81 to be disposed along the scroll portion 11d with space on the opposite sides of the passage opening 24.

The height of the guide 70 and the scroll plate 81 within the scroll portion 11d is substantially the same. Changes in the cross section of the scroll portion 11d (changes in the cross-sectional shape and dimension) are thus relatively small despite the provision of the grass discharge passage 21 to the housing 11. As a result, the scroll portion 11d allows smooth and sufficient swirling of air and grass clippings.

Figure 5:
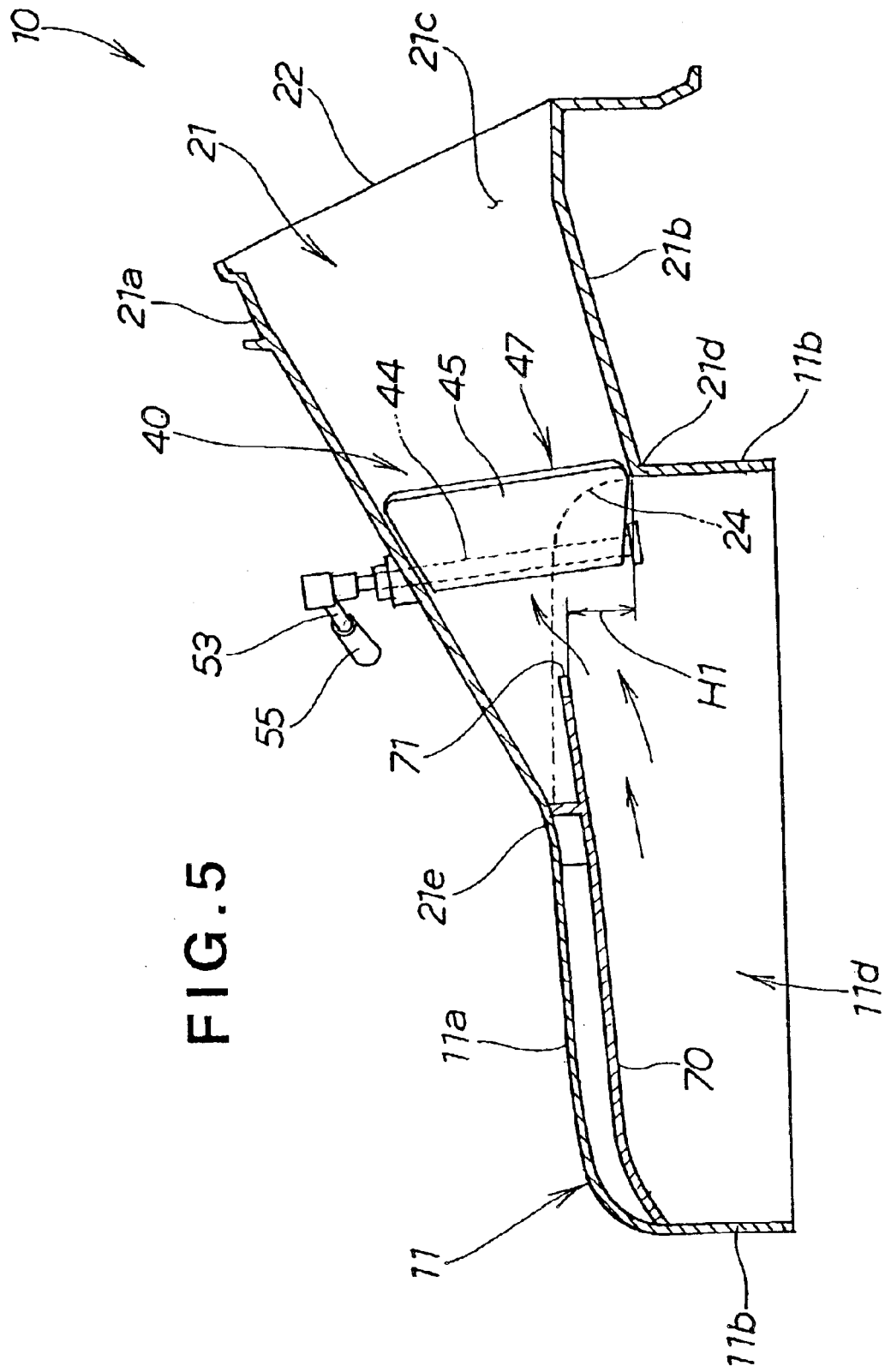
FIG. 5 is a cross-sectional view of line 5—5 in FIG. 4.

As shown in FIG. 5, the grass discharge passage 21 is extended rearward and upward from the housing 11 in the location of the scroll 11d, and the receptacle mounted portion 22 is provided at the outlet of the grass discharge passage 21.

More specifically, the grass discharge passage 21 has a substantially rectangular cross section, and is formed by an enclosure including a top plate 21a extended rearward and upward from a middle portion of the top plate 11a of the housing 11, a bottom plate 21b extended rearward and upward from a middle height of the outer tubular portion 11b of the housing 11, and left and right side plates 21c, 21c between the top plate 21a and the bottom plate 12b (only the right side plate 21c is shown in this figure).

The "passage opening 24 facing the housing 11 of the grass discharge passage 21" indicates an opening enclosed with a proximal end portion of the top plate 21a, a proximal end portion of the bottom plate 21b and proximal end portions of the left and right side plates (left and right vertical walls) 21c, 21c, relative to the housing 11.

As is clear from the above, since the bottom plate 21b is absent at a portion of the passage opening 24 of the grass discharge passage 21, the portion has a downwardly-opening channel-shaped cross section (a substantially U-shaped cross section opening downward) instead of the substantially rectangular cross section.

The bottom of the passage opening 24, that is, a proximal end 21d of the bottom plate 21b relative to the outer tubular portion 11b is lower in level than the top plate 11a of the housing 11 as is obvious.

In the mulching mode, the lawn mower 10 causes grass cut by the cutting blade 14 (see FIG. 4) to swirl upward with the cutting blade 14 within the scroll portion 11d, cutting more finely the grass clippings falling after reaching near the top plate 21a with the cutting blade 14, and discharging them downward of the housing 11.

In the bagging mode and the intermediate mode, the lawn mower 10 also causes grass clippings to swirl upward with the cutting blade 14 within the scroll portion 11d as will be understood. The above-described configuration of a portion of the passage opening 24 of the grass discharge passage 21 facilitates the entering of swirling grass clippings from the passage opening 24 into the grass discharge passage 21 as shown by arrows in the bagging mode or intermediate mode with the shutter 40 opened.

Reference numeral 21e denotes a proximal end portion of the top plate 12a relative to the top plate 11a.

This figure further illustrates that the guide 70 is provided below the top plate 11a with a certain clearance within the scroll portion 11d, and the height of the rear guide end 71 of the guide 70 is set larger by a height H1 than that of the bottom of the passage opening 24.

The height of the rear guide end 71 of the guide 70 for directing grass clippings toward the grass discharge passage 21 set larger than that of the bottom of the passage opening 24 facilitates taking grass clippings swirling along the guide 70 into the grass discharge passage 21 in the intermediate mode. As a result, a required amount of grass clippings can be securely received through the grass discharge passage 21 in the grass receptacle 23 (see FIG. 1). The ratio between the amount of glass clippings to be received in the grass receptacle 23 and the amount of grass clippings to be discharged downward of the housing 11 can thus be relatively precisely set in the intermediate mode. The workability in the intermediate mode can be further improved.

Now, with reference to FIGS. 4 and 5, the configuration of the housing 11 will be summarized.

The housing 11 has the scroll portion 11d in a scroll shape connected to the passage opening 24 of the grass discharge passage 21 extending rearward and upward. The top plate 11a is thus formed higher in level as extending in a spiraling direction of the scroll portion 11d (in the direction of the hollow arrows Rc in FIG. 4), that is, formed deeper rearward of the paper of FIG. 4.

In other words, as shown in FIG. 4, the height of the top plate 11a at the scroll portion 11d is smallest at a portion where the scroll plate 81 is provided, becomes larger as extending in the direction of the hollow arrows Rc, and is largest at a portion connected to the passage opening 24.

In this embodiment, a portion of the scroll portion 11d provided with the scroll plate 81 is referred to as a "portion without the scroll portion" and the remaining portion without the scroll plate 81 is referred to as a "portion with the scroll portion."

In this embodiment, the guide 70 is placed along the scroll portion 11d for allowing grass clippings to swirl within the bagging-mode housing 11 while directing them toward the grass discharge passage 21, the guide 70 is provided beneath the top plate 11a of the housing 11, and the rear guide end 71 of the guide 70 is opposed to the passage opening 24, so that the flow direction Rc (the direction of the hollow arrows Rc) of an air flow swirling grass clippings within the housing 11, that is, a swirling flow can be gradually changed and guided toward the passage opening 24 with the guide 70.

Furthermore, since the guide 70 placed along the scroll portion 11d is provided beneath the top plate 11a of the bagging-mode housing 11, the cross-sectional area of the housing 11 can be gradually changed between a portion with the scroll portion 11d and a portion without the scroll portion 11d. The gradual change of the cross-sectional area results in a gradual change of the flow velocity of a swirling flow between a portion with the scroll portion 11d and a portion without the scroll portion 11d.

Thus, in the mulching mode in which the grass discharge passage 21 is blocked off, a swirling flow guided with the guide 70 smoothly continues swirling within the housing 11. Grass clippings thus hardly accumulate within the housing 11. No accumulation of grass clippings allows continuous grass cutting operations. This results in an increased efficiency in mulching-mode operations. Further, grass clippings can be evenly discharged downward from the housing 11. The return amount of grass clippings returned from the housing 11 to the lawn is thus even, improving the finished quality of the grass cutting.

In the bagging mode with the grass discharge passage 21 opened, a swirling flow (carrying flow) guided by the guide 70 flows from the passage opening 24 into the grass discharge passage 21 to discharge grass clippings into the grass receptacle 23. The operating efficiency in the bagging mode can be secured.

In this manner, the operating efficiency in the mulching mode can be improved with the operating efficiency in the bagging mode being secured, improving the finished quality of grass cutting.

Figure 6:
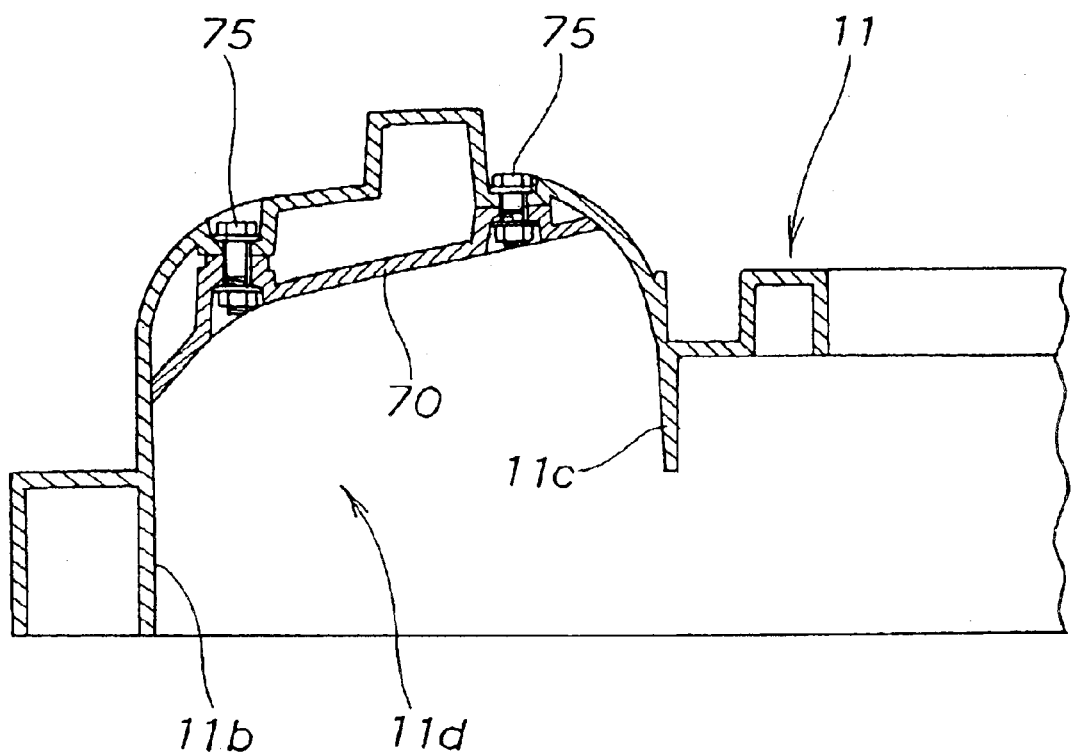
FIG. 6 is a cross-sectional view of line 6—6 in FIG. 4.

As shown in FIG. 6, the guide 70 is secured to the housing 11 with a plurality of bolts 75.

Figure 7A:
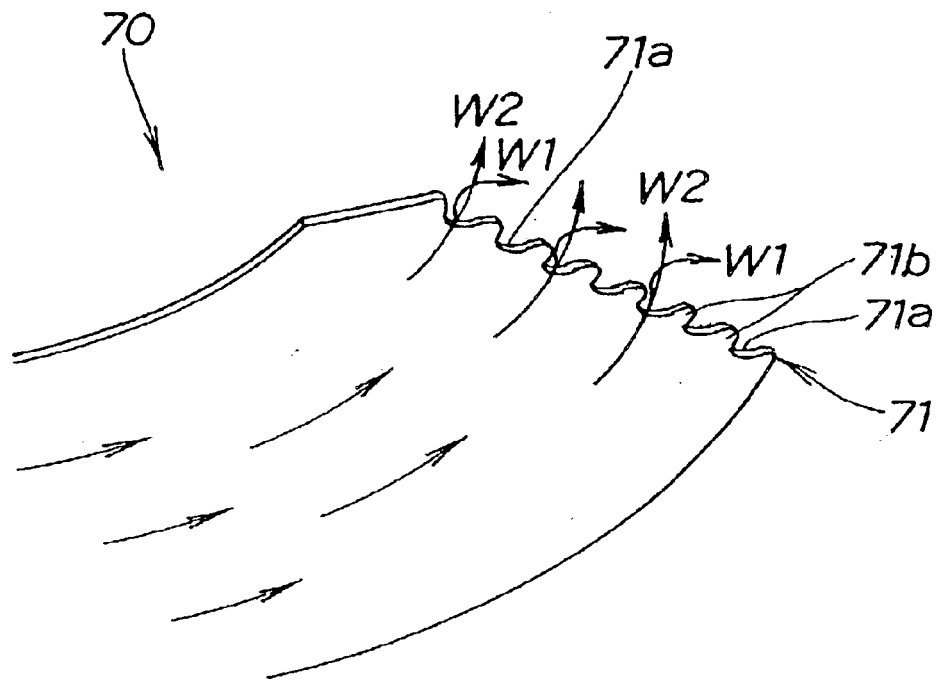
FIG. 7A is a perspective view of a rear guide end of a guide shown in FIG. 4.
Figure 7B:
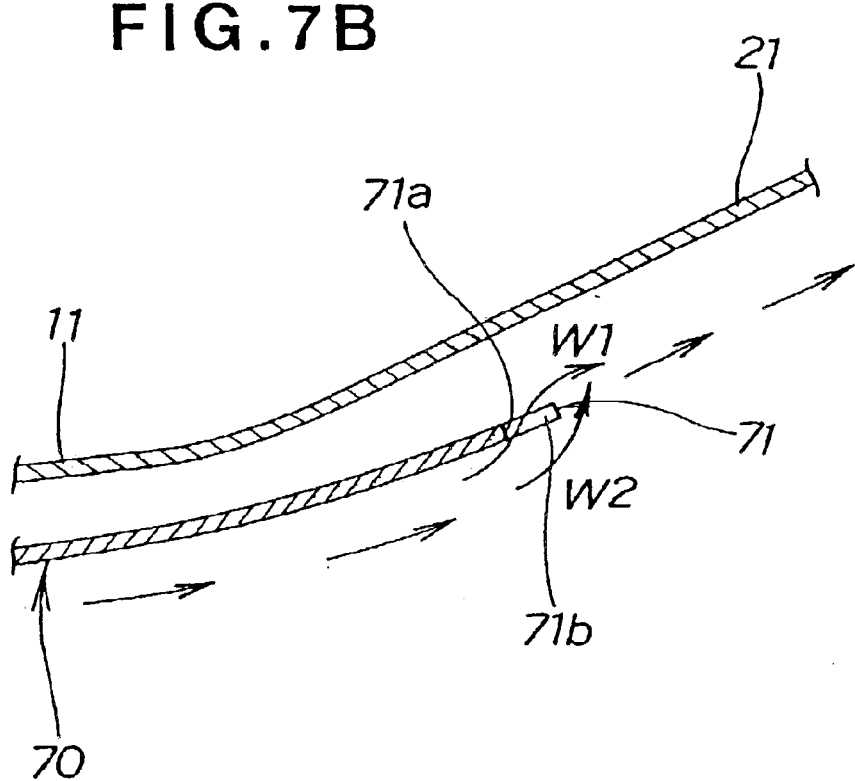
FIG. 7B is a cross-sectional view illustrating the relationship of the rear guide end with a housing.

FIGS. 7A and 7B are structural diagrams of the rear guide end 71 of the guide 70 and surroundings; FIG. 7A is a perspective view of the rear guide end 71 of the guide 70 in a flat plate, taken from below; and FIG. 7B is a cross-sectional view of the relationship of the rear guide end 71 with the housing 11, taken from the side. FIG. 7A illustrates that the rear guide end 71 of the guide 70 of a flat plate has a plurality of depressions 71a and a plurality of projections 71b which are alternately arranged across the plate in a wave shape.

When the cutting blade 14 (see FIG. 4) is rotated, an air flow is generally produced along the guide 70 below the guide 70. This flow tends to become a vortex flow at the rear guide end 71. When the vortex flow is excessive, grass clippings are likely to be drawn into the vortex flow. As a result, in the bagging mode or the intermediate mode, the grass clippings have difficulty in flowing into the passage opening 24 (see FIG. 4).

In the present embodiment, the wave-shaped rear guide end 71 of the guide 70 causes interference between air flows W1 at the depressions 71a in the wave shape and air flows W2 at the projections 71b to reduce the generation of vortex flows, straightening an air flow flowing into the passage opening 24. As a result, in the bagging mode or the intermediate mode, grass clippings more easily flow into the passage opening 24. Grass clippings are thus allowed to smoothly flow into the grass receptacle 23 (see FIG. 1) through the grass discharge passage 21 (see FIG. 4) to be more securely received.

FIG. 8 is a cross-sectional view of line 8—8 in FIG. 3. The shutter 40 includes a vertically-extending rotary shaft 44 provided in the vicinity of the passage opening 24, adjacent either of the left and right side plates 21c of the grass discharge passage 21, that is, either of the left and right vertical walls 21c, a vertical shield 45 of a vertical plate attached at its swing proximal end to the rotary shaft 44 for opening and closing the passage opening 24 by swinging operation, a horizontal shield 46 of a horizontal plate extending from the bottom of the vertical shield 45 toward the receptacle mounted portion 22 (see FIG. 5) for blocking a lower portion of the passage opening, and an opening control lever 53 (control lever 53) coupled to the rotary shaft 44. The shutter 40 can be swung with the opening control lever 53.

More specifically, the shutter 40 has a lower bearing 42 attached to a lower portion of the left side plate 21c of the grass discharge passage 21 with a support bracket 41, and an upper bearing 43 attached to the top plate 21a of the grass discharge passage 21. The upper and lower bearings 412 and 43 rotatably support the rotary shaft 44. The vertical shield 45 and the horizontal shield 46 are attached to the rotary shaft 44.

As is also apparent from the figure, the grass discharge passage 21 and the shutter 40 are higher in level than the cutting blade 14. The cutting blade 14 even rotated cannot interfere with the grass discharge passage 21 and the shutter 40.

The rotary shaft 44 has at its distal end the opening control lever 53 attached thereto vertically swingably while being controlled in its horizontal swing, the opening control lever 53 being resiliently biased with a return spring 54 such as a torsion spring to a neutral position (a location notch 56b) shown by solid lines. The vertical shield 45 and the horizontal shield 46 are formed by bending a plate material in a substantially L shape in a side view, forming an integrally-formed shutter member 47. The rotary shaft 44 is rotated with the opening control lever 53 to allow the shutter member 47 to swing vertically to the paper of this figure.

Figure 9:
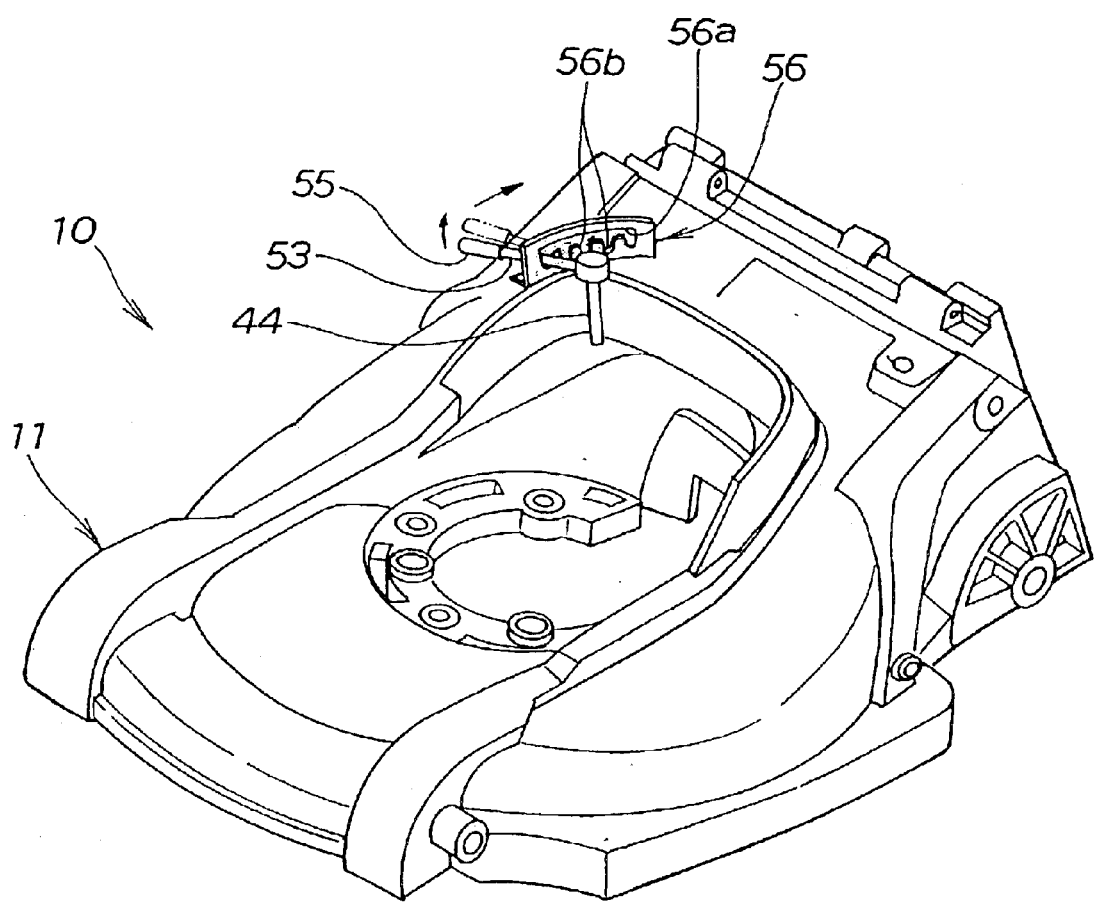
FIG. 9 is a perspective view of the housing, an opening control lever and surrounding parts according to the first embodiment.

FIG. 9 is a perspective view of the housing, the opening control lever and surrounding parts according to the present embodiment, illustrating that a control guide 56 is provided on a rear upper surface of the housing 11 and the control guide 56 guides the control of the opening control lever 53.

The control guide 56 has a horizontally-elongated guiding long hole 56a for inserting the opening control lever 53 therethrough and a plurality of vertically-elongated location notches 56b arranged along the guiding long hole 56a. The location notches 56b each extend downward from the guiding long hole 56a. Reference numeral 55 denotes a grip.

Figure 10:
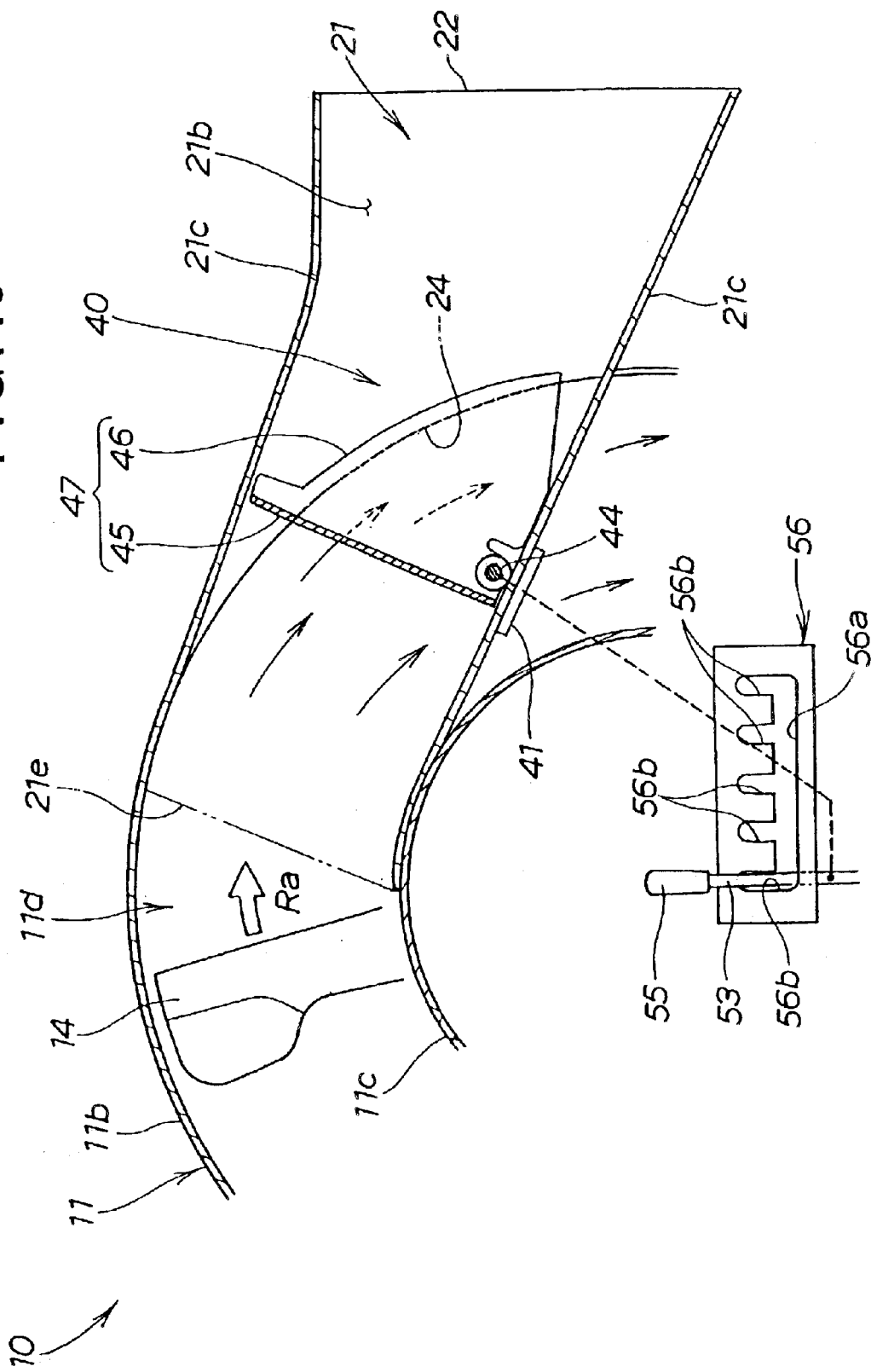
FIG. 10 is a cross-sectional view illustrating the relationship among the housing, a cutting blade, a passage opening of a grass discharge passage and a shutter according to the present invention, the passage opening being closed by a shutter member.

FIG. 10 is a plan view illustrating the relationship among the housing, the cutting blade, the passage opening of the grass discharge passage and the shutter according to the present invention, illustrating that the shutter member 47 provided in the grass discharge passage 21 allows the passage opening 24 to be opened and closed.

As is clear from the figure, the proximal end of the right side plate 21c of the grass discharge passage 21 is tangential to the outer tubular portion 11b, and the proximal end of the left side plate 21c is tangential to the inner tubular portion 11c.

As described above, the passage opening 24 of the grass discharge passage 21 is enclosed with the proximal end 21e of the top plate 21a (see FIG. 5), the proximal end portion of the bottom plate 21b and the proximal end portions of the left and right side plates 21c, 21c, relative to the housing 11, being an opening portion in a substantially crescent shape in a plan view. At the opening portion, the rotary shaft 44 and the vertical shield 45 are disposed as shown in FIG. 10. This arrangement allows a more smooth flow of grass clippings in the bagging mode in which the vertical shield 45 is fully opened or in the intermediate mode in which the vertical shield 45 is half opened.

In the mulching mode in which the vertical shield 45 is fully closed, however, the grass discharge passage 21 communicates with the scroll portion 11d via the passage opening 24. This reduces by half the effect of closing the vertical shield 45. To prevent this is provided the horizontal shield 46 of a horizontal plate extending from the bottom of the vertical shield 45 toward the receptacle mounted portion 22 for closing a lower portion of the passage opening 24. This results in an increased shielding efficiency in shielding the grass discharge passage 21 against the scroll portion 11d with the vertical shield 45 fully closed.

In this manner, operations in the bagging mode, mulching mode and intermediate mode can be more efficiently performed with the single housing 11.

The control guide 56 is a member serving as a guide for the opening control lever 53 when the degree of opening of the shutter 40 is controlled, having, e.g., five location notches 56b. The location of the location notch 56b facing one end of the guiding long hole 56a defines a full-close position and the location of the location notch 56b facing the other end of the guiding long hole 56a defines a full-open position. The spacing between adjacent location notches 56b may be set to correspond to a 25% opening of the shutter 40.

Now, the function of the lawn mower 10 of the above structure will be described with reference to FIGS. 10 to 15.

FIG. 10 illustrates that the opening control lever 53 is put in the full-close position to put the shutter member 47 in a full-close position (0% opening). Closing the passage opening 24 with the shutter member 47 allows the lawn mower 10 to be set in a form for use in the mulching mode. A portion of the passage opening 24 is closed by the horizontal shield 46.

In this state, grass clippings swirl below the passage opening 24 in a direction of arrows within the housing 11, that is, within the scroll portion 11d. As a result, the grass clippings can be cut more finely by the cutting blade 14 within the housing 11 and discharged downward of the housing 11. From this state, the shutter member 47 can be swung clockwise in the figure to be opened.

Figure 11:
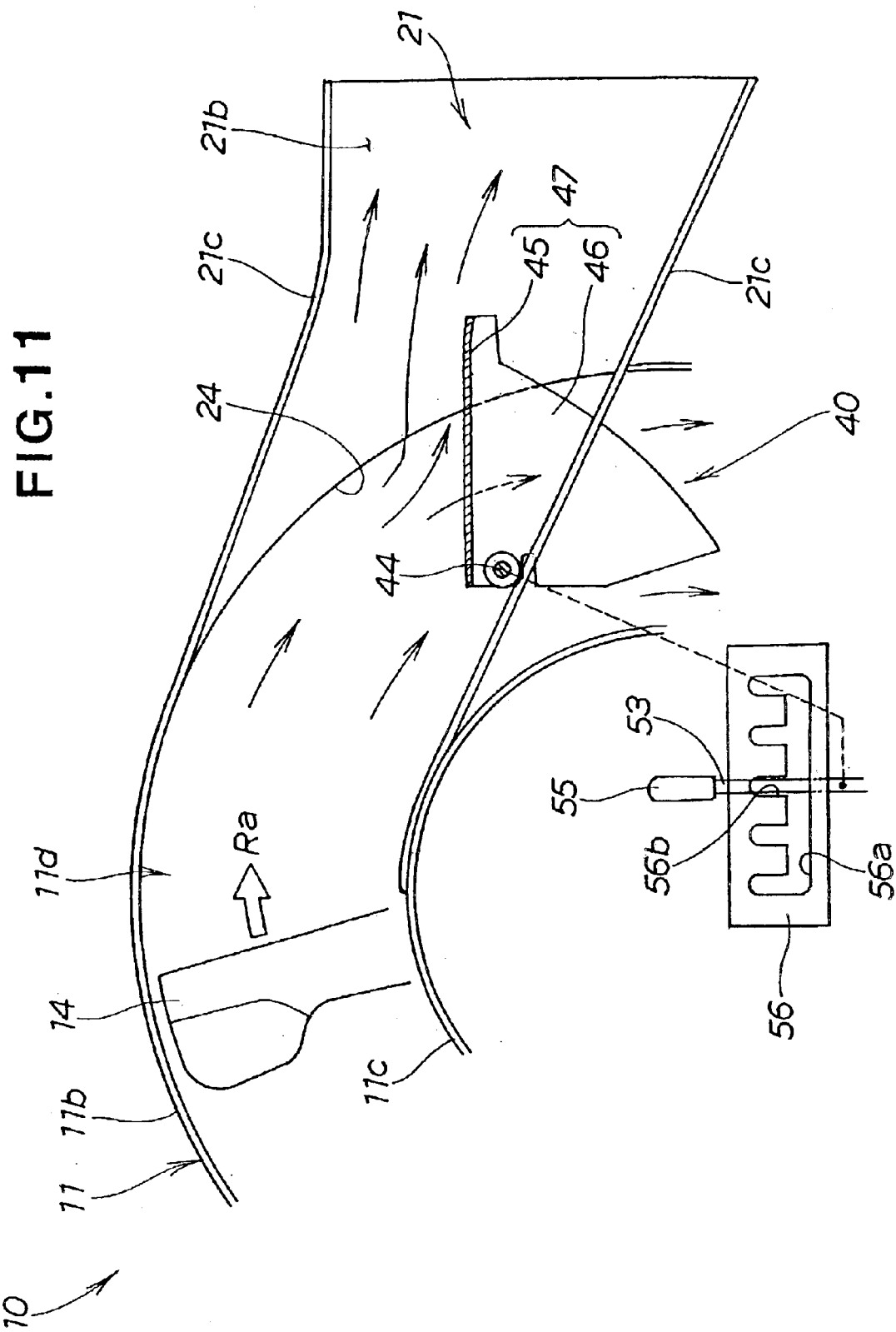
FIG. 11 is a cross-sectional view illustrating the shutter member put in an intermediate mode from the state in FIG. 10.

FIG. 11 illustrates that the opening control lever 53 is put in a half-open position to put the shutter member 47 in a half-open position (50% opening). opening the passage opening 24 by a desired degree of opening with the shutter member 47 allows the lawn mower 10 to be set in a form for use in the intermediate mode (mode intermediate between the bagging mode and the mulching mode), returning part of grass cut by the cutting blade 14 to the ground and receiving the rest in the grass receptacle 23 (see FIG. 1). Also in this mode, a portion of the passage opening 24 is closed by the horizontal shield 46.

Figure 12:
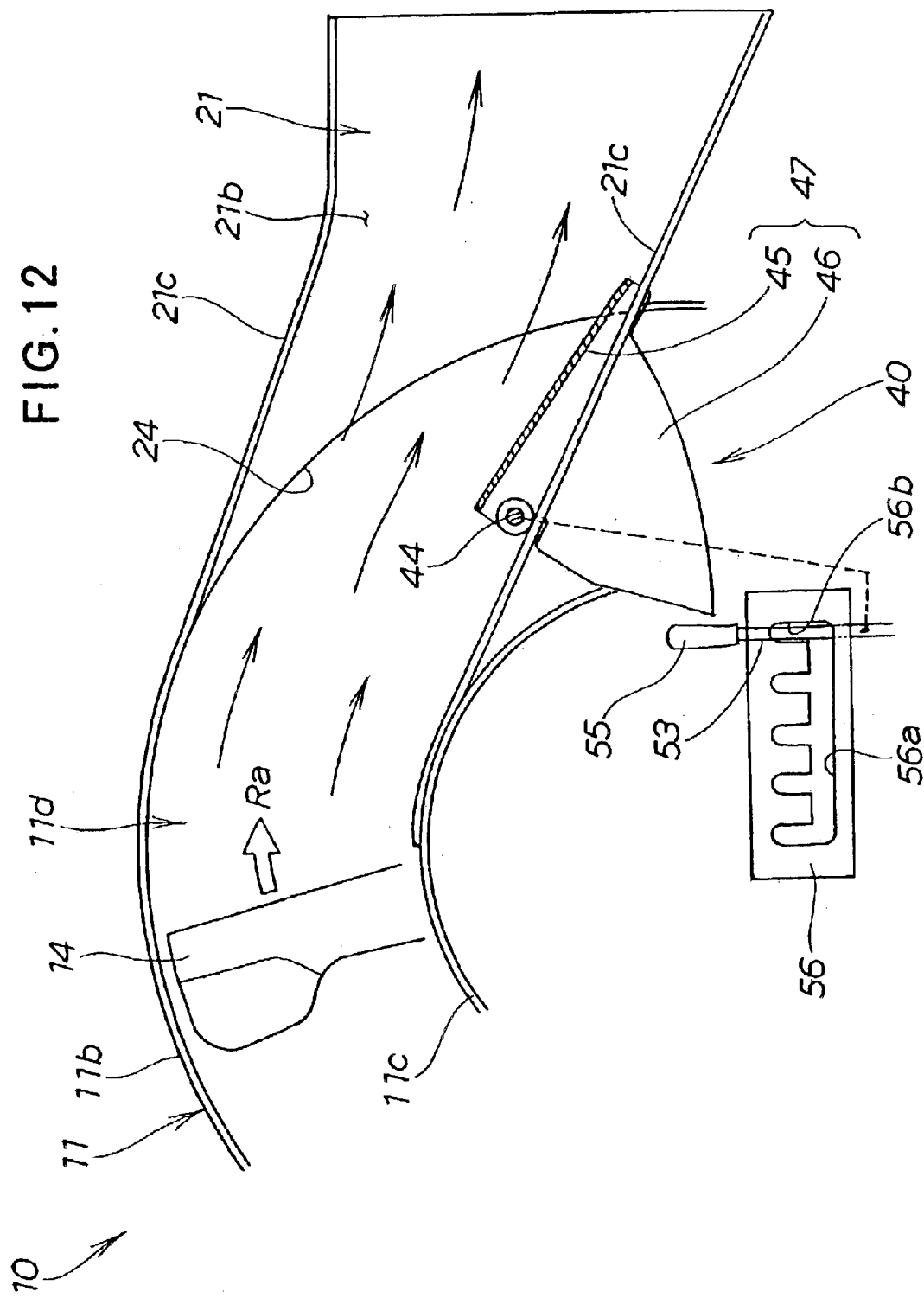
FIG. 12 is a cross-sectional view of the shutter member brought into a fully-opened state from the state shown in FIG. 11.

FIG. 12 illustrates that the opening control lever 53 is put in the full-open position to put the shutter member 47 in a full-open position (100% opening). With the shutter member 47 put in the full-open position, the vertical shield 45 is adjacent an inner surface of the left side plate 21c. Full opening of the passage opening 24 allows the lawn mower 10 to be set in a form for use in the bagging mode and receive grass cut by the cutting blade 14 in the grass receptacle 23 (see FIG. 1).

In this manner, the shutter 40 is provided at the passage opening 24 facing the housing 11 of the grass discharge passage 21 extending rearward from the downward-opening housing 11. The shutter 40 consists of the vertically-extending rotary shaft 44 provided in the vicinity of the passage opening 24, adjacent either of the left and right vertical walls 21c of the grass discharge passage 21, the vertical shield 45 of a vertical plate attached at its swing proximal end to the rotary shaft 44 for opening and closing the passage opening 24 by swinging operation, the horizontal shield 46 of a horizontal plate extending from the bottom of the vertical shield 45 toward the receptacle mounted portion 22 for closing the lower portion of the passage opening 24, and the opening control lever 53 coupled to the rotary shaft 44, so that the degree of opening of the passage opening 24 can be desirably adjusted with the shutter 40.

Only controlling the opening of the shutter 40 with a simple configuration allows switching between the bagging mode in which the shutter 40 is fully opened to receive grass clippings in the grass receptacle 23 (see FIG. 1), the mulching mode in which the shutter 40 is fully closed to discharge grass clippings downward of the housing 11, and the intermediate mode between the bagging mode and the mulching mode in which the shutter 40 is opened to a desired degree. It is needless to change parts every time the mode is switched.

Further, opening the shutter 40 to a desired degree allows minute and preferable setting of the form of discharge of grass clippings, according to lawn conditions, required finished quality, or preference. Furthermore, switching to the intermediate mode allows the reduction of the discharged flow amount of grass clippings discharged from the housing 11 to the grass receptacle 23. This results in a lengthened time during which grass clippings accumulate in the grass receptacle 23, reducing the frequency of replacement of the grass receptacle 23.

For efficient operations in the bagging mode, the scroll portion 11d is provided in the housing 11 for allowing grass clippings to swirl within the housing 11 while directing them to the grass discharge passage 21. Also for efficient operations in the mulching mode, the guide 70 is placed along the scroll portion 11d, being provided beneath the top plate 11a of the housing 11, and the rear guide end 71 of the guide 70 is opposed to the passage opening 24.

Thus, when the shutter is opened as shown in FIG. 12, the scroll portion 11d and the guide 70 (see FIG. 5) allow grass clippings to swirl while being smoothly guided to the passage opening 24.

When the shutter 40 is closed as shown in FIG. 10, grass clippings swirling in the scroll portion 11d can be guided by the guide plate 70 (see FIG. 5) to smoothly flow along the shutter 40 in the closed state. The same is true in the intermediate mode.

In this manner, operations in the bagging mode, mulching mode and intermediate mode can be more efficiently performed with the single housing 11.

The housing 11 has, as described above, the outer tubular portion 11b and the inner tubular portion 11c which are cylindrical about the shaft center SC (see FIG. 4). The grass discharge passage 21 is extended tangentially to the outer tubular portion 11b. The shutter 40 is provided at the passage opening 24 facing the housing 11. The direction of the grass discharge passage 21 extending from the outer tubular portion 11b agrees with a rotation direction Ra of the cutting blade 14. In other words, the grass discharge passage 21 extends tangentially to the rotating path of the cutting blade 14. The passage opening 24 opens in the rotation direction Ra of the cutting blade 14.

The outer side plate 21c of the grass discharge passage 21 extends tangentially to the outer tubular portion 11b and the inner side plate 21c extends tangentially to the inner tubular portion 11c. The rotary shaft 44 of the shutter 40 is disposed in the vicinity of the inner side plate 21c. The swing distal end of the shutter member 47 thus faces the outer side plate 21c. The shutter member 47 opens in the rotation direction Ra of the cutting blade 14. As will be understood, when the vertical shield 45 of the shutter 47 is opened at a certain angle, the amount of displacement of the swing distal end of the vertical shield 45 is greater than the amount of displacement of the swing proximal end. When the vertical shield 45 is opened at a certain angle, a greatly-displaced peripheral portion of the vertical shield 45 can thus relatively largely open the passage opening 24.

The swirling velocity of grass clippings swirling within the housing 11 by the rotation of the cutting blade 14 is higher as being farther from the shaft center SC.

As is apparent from the above, when the passage opening 24 of the grass discharge passage 21 extending tangentially to the outer tubular portion 11b is opened to some degree (more than 0% and less than 100% opening) with the vertical shield 45 in the intermediate mode, grass clippings swirling at a high velocity through the periphery of the housing 11 easily flow from the passage opening 24 into the grass discharge passage 21. This results in an increased efficiency in the reception of grass clippings in the intermediate mode.

Figure 13:
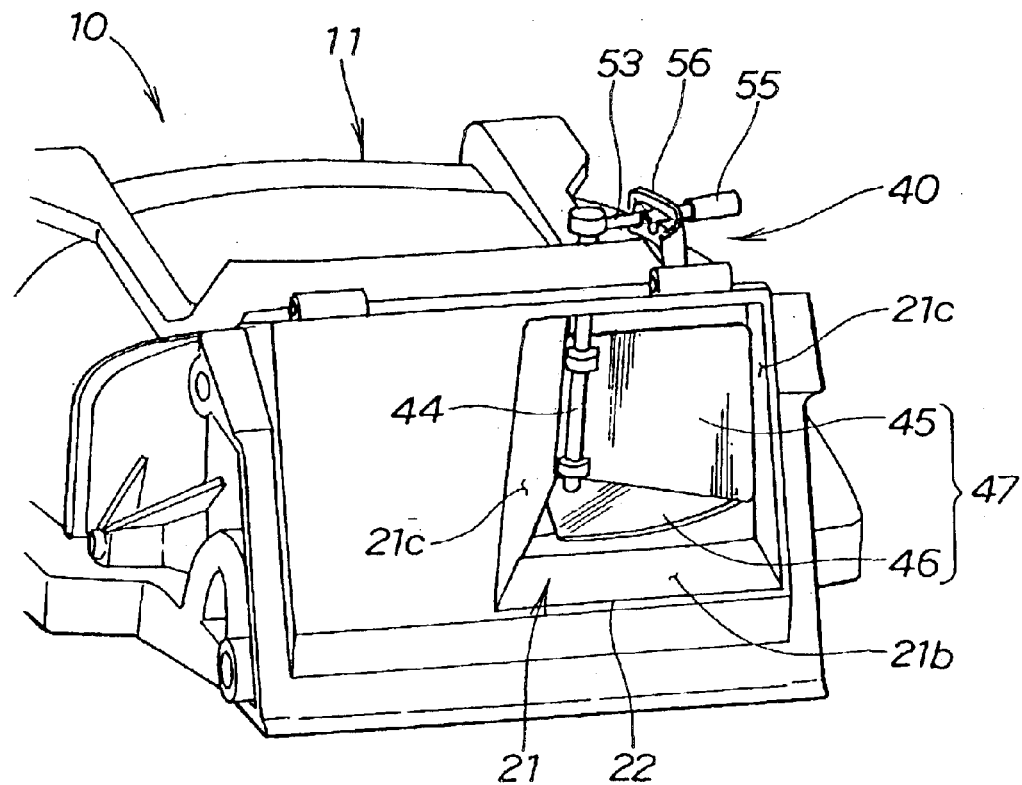
FIG. 13 is a perspective view illustrating the shutter in a fully-closed state.

FIG. 13 is a view of the lawn mower 10 with the shutter 40 in a full-close position, taken from the side of the receptacle mounted portion 22.

Figure 14:
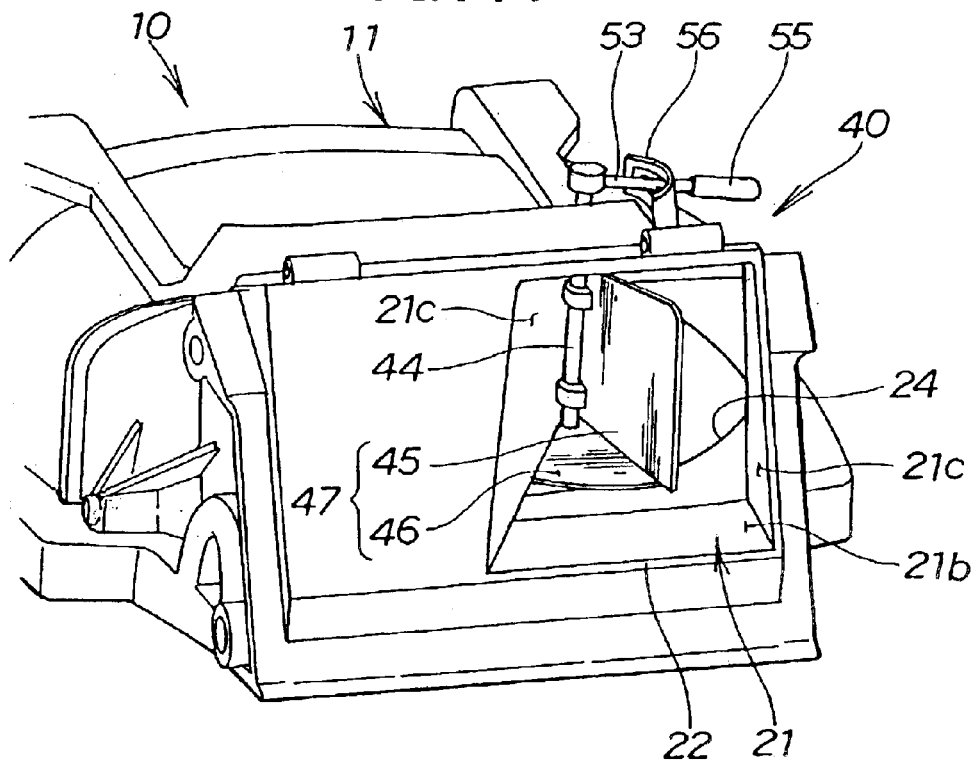
FIG. 14 is a perspective view illustrating the shutter in a half-opened state.

FIG. 14 is a view of the lawn mower 10 with the shutter 40 in a half-open position, taken from the side of the receptacle mounted portion 22.

Figure 15:
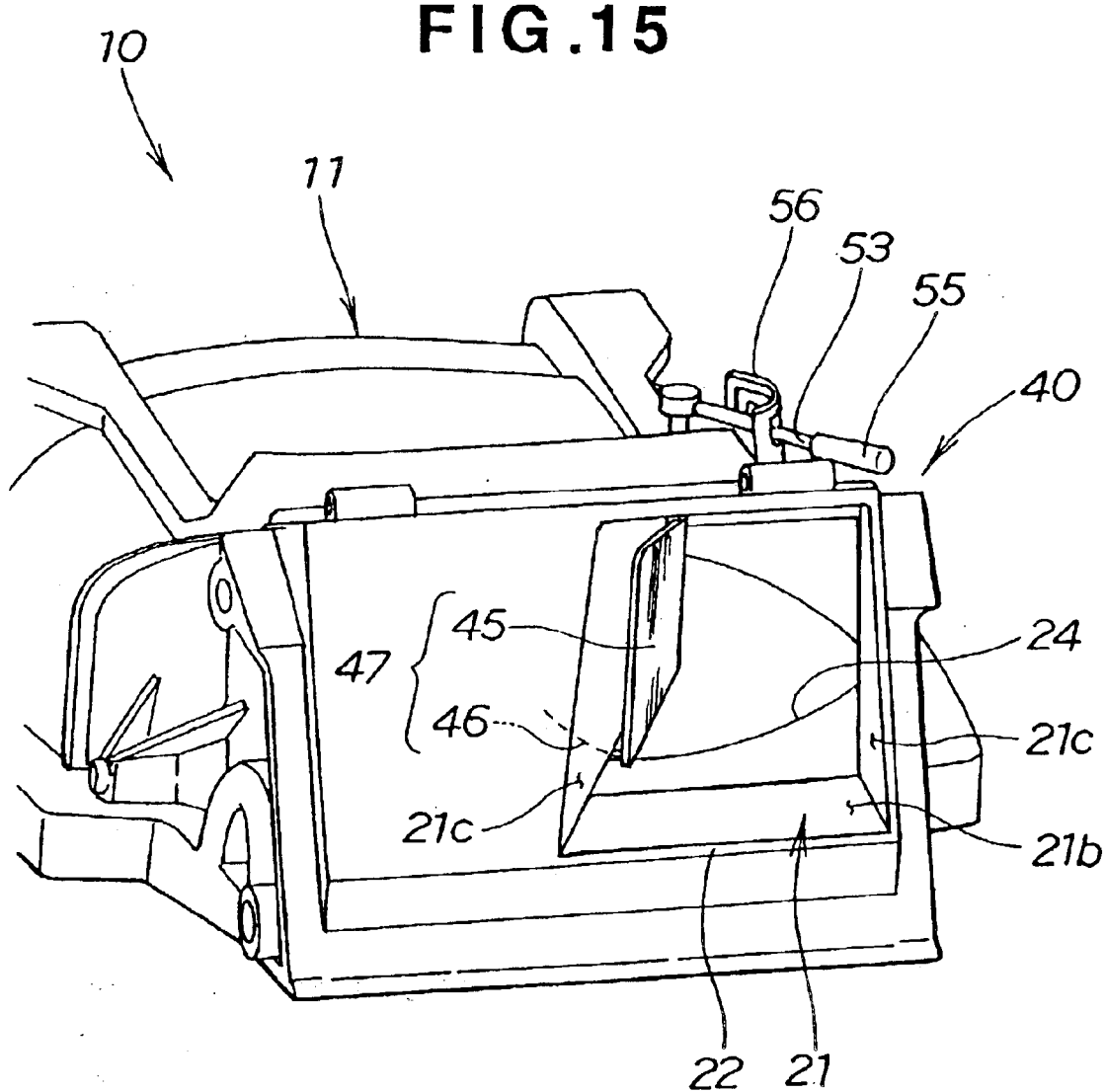
FIG. 15 is a perspective view illustrating the shutter in the fully-opened state.

FIG. 15 is a view of the lawn mower 10 with the shutter 40 in a full-open position, taken from the side of the receptacle mounted portion 22.

Now a lawn mower according to a second embodiment of the present invention will be described with reference to FIGS. 16 to 22. Components identical to those in the first embodiment shown in FIGS. 1 to 15 are affixed the same reference numerals and will not be described.

Figure 16:
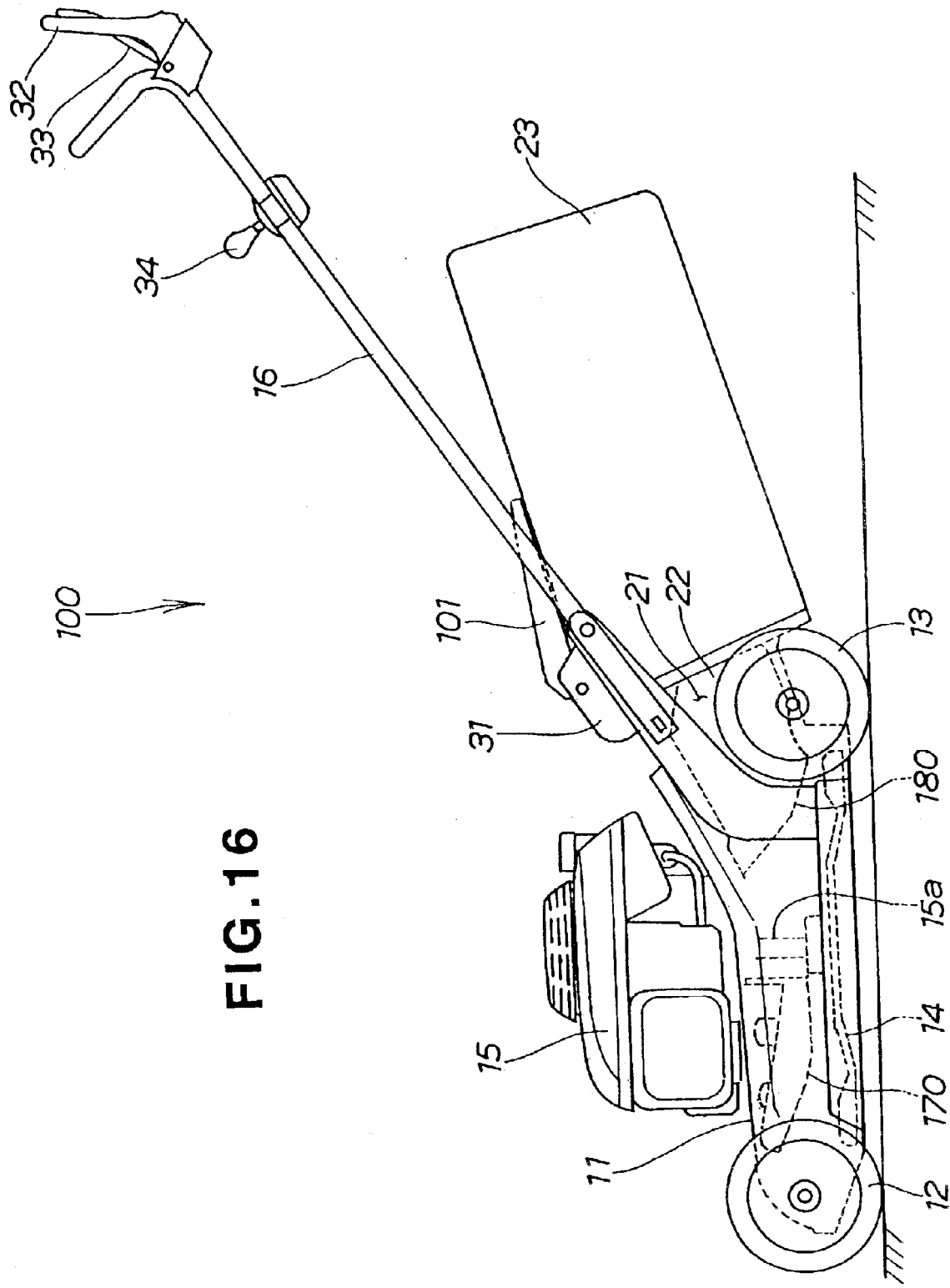
FIG. 16 is a left side view of a lawn mower according to a second embodiment of the present invention.
Figure 17:
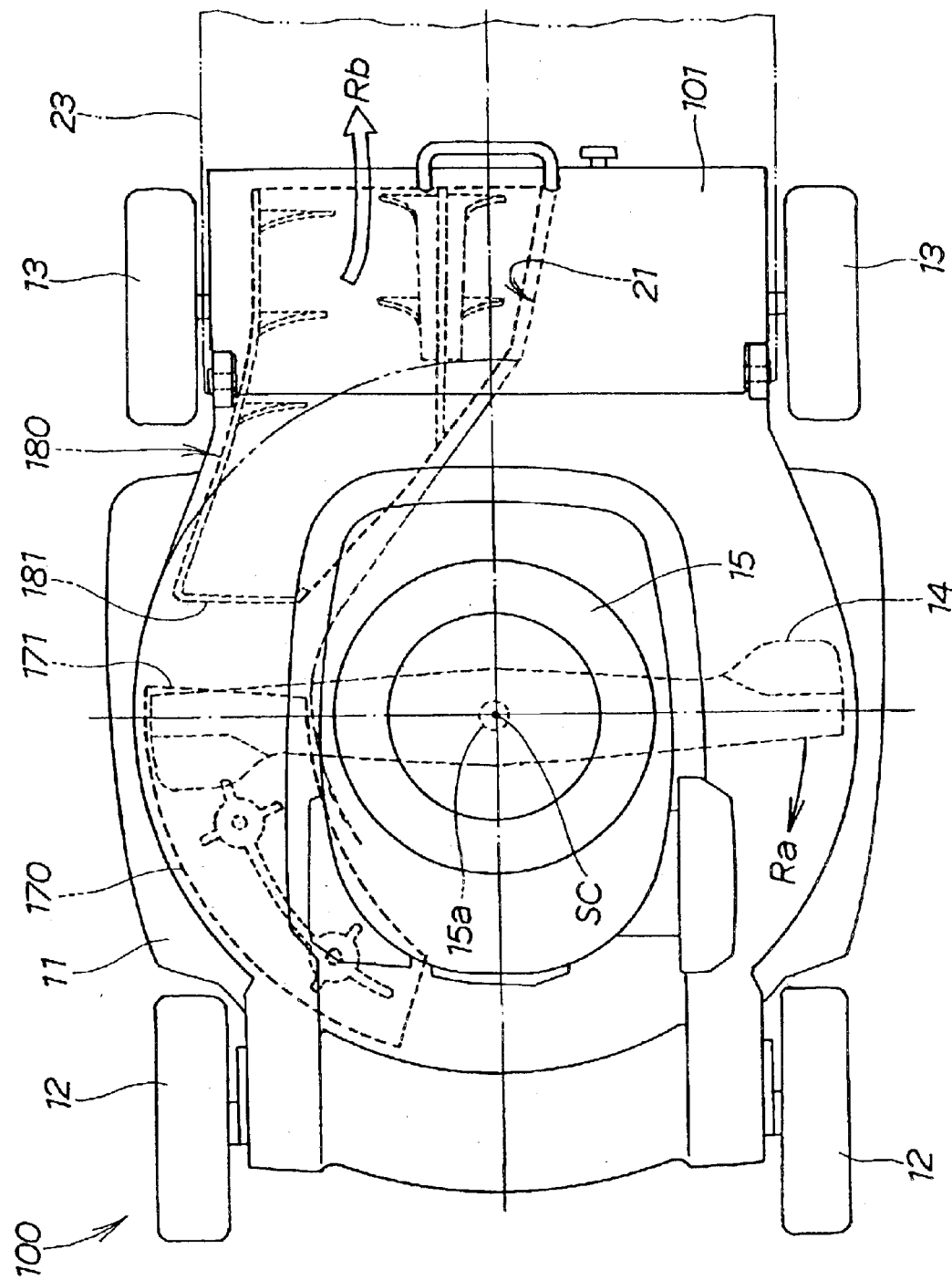
FIG. 17 is a plan view of the lawn mower shown in FIG. 16.
Figure 18:
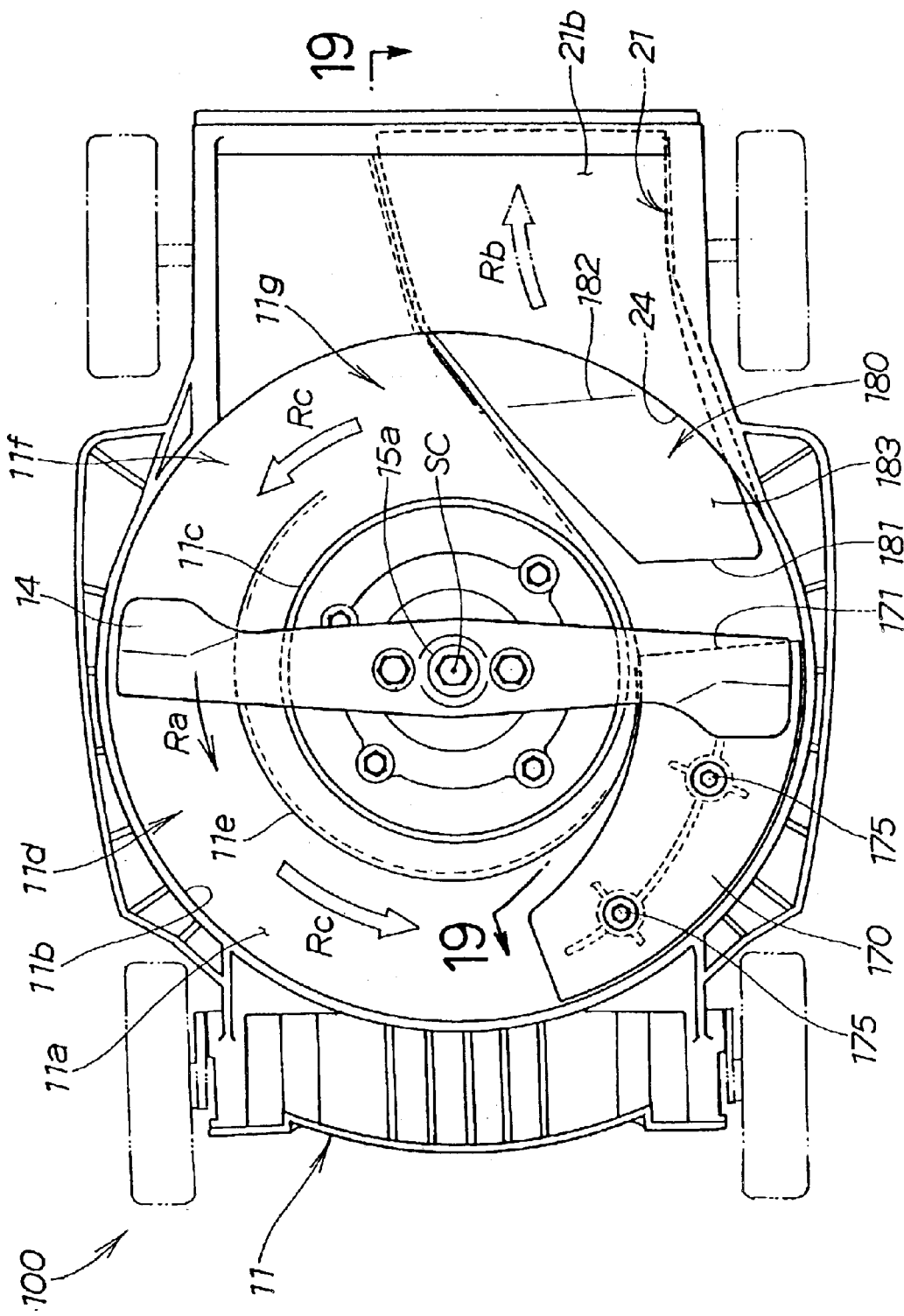
FIG. 18 is a bottom view of the lawn mower shown in FIG. 16.

As shown in FIGS. 16, 17 and 18, a lawn mower 100 modified according to the second embodiment is characterized in that an openable and closable lid 101 is provided at an outlet of a grass discharge passage 21, a member for opening and blocking the grass discharge passage 21 is a plug member 180 (plug) to be removed out of or inserted into the grass discharge passage 21, and a guide 170 is provided at a scroll portion 11d.

The lawn mower 100 of the second embodiment has, as shown in FIG. 18, in order to efficiently perform bagging-mode operations, the scroll portion 11d provided to the housing 11 for allowing grass clippings to swirl within the housing 11 while directing them to the grass discharge passage 21, and has, in order to efficiently perform mulching-mode operations, the guide 170 placed along the scroll portion 11d, being provided beneath a top plate 11a of the housing 11, and a rear guide end 171 of the guide 170 opposed to a passage opening 24. The configurations of the components will be described in detail below.

The plug member 180 extends toward the rear guide end 171 of the guide 170 within the housing 11. More specifically, the plug member 180 inserted from the outlet (right in the figure) of the grass discharge passage 21 is protruded from the passage opening 24 into the scroll portion 11d, and a distal end 181 thereof is extended in a curve along the scroll portion 11d to the vicinity of the rear guide end 171, to be opposed to the rear guide end 171.

Figure 19:
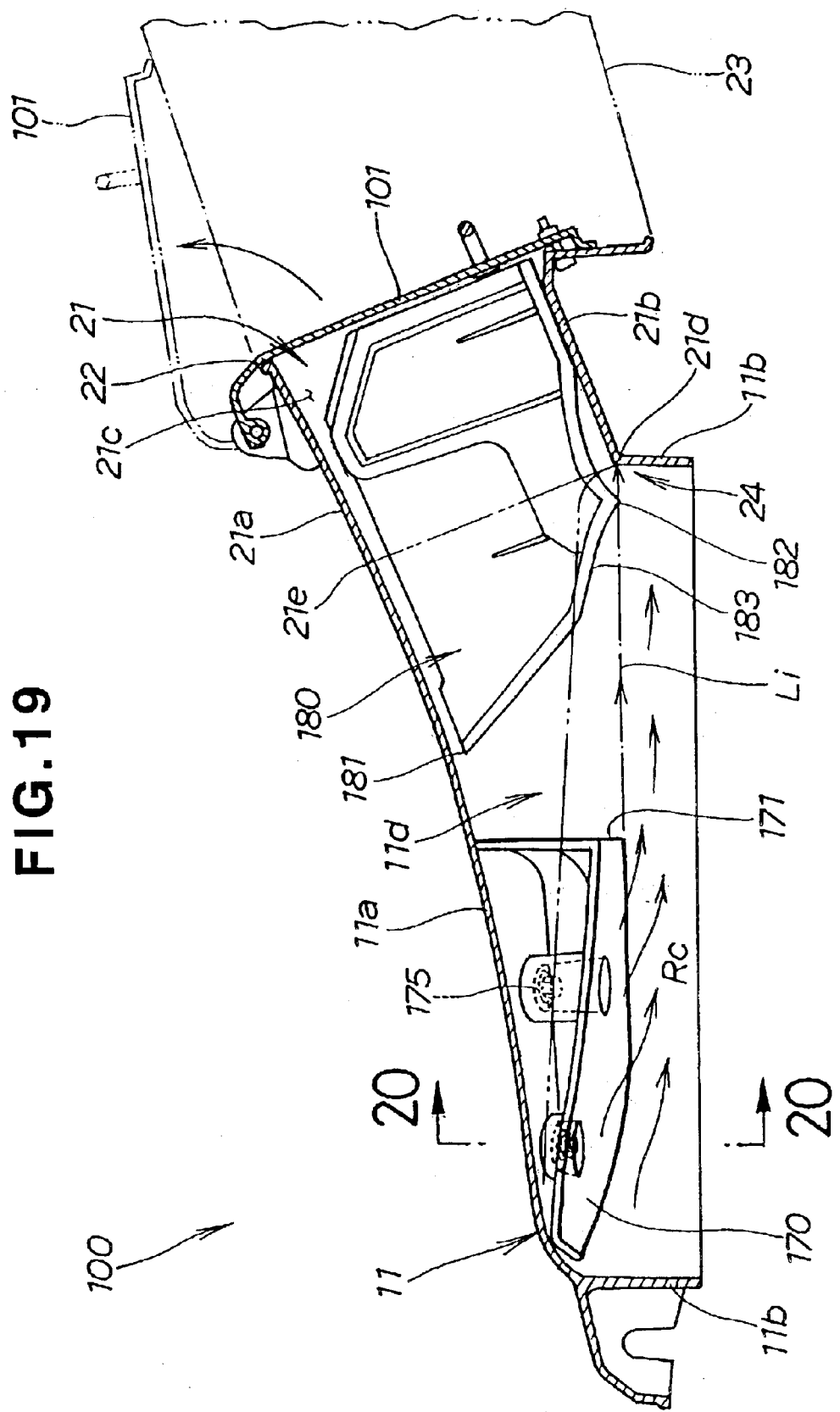
FIG. 19 is a cross-sectional view of line 19—19 in FIG. 18.

FIG. 19 illustrates that the grass discharge passage 21 is extended rearward and upward from the housing 11 in the location of the scroll portion 11d and a receptacle mounted portion 22 is provided at the outlet of the grass discharge passage 21.

This figure also illustrates that the guide 170 is provided in the scroll portion 11d below the top plate 11a with a certain clearance and the rear guide end 171 of the guide 170 is generally oriented toward the bottom of the passage opening 24, that is, a proximal end 21d of a bottom plate 21b. Reference sign Li is an orientation line in which the rear guide end 71 is directed toward the bottom of the passage opening 24.

The plug member 180 is characterized in that a lower end 182 thereof is placed at a height substantially identical to that of the rear guide end 171, that is, in the orientation line Li.

The lid 101 is closed after a grass receptacle 23 shown in imaginary lines is removed and the plug member 18 is put into the grass discharge passage 21. Closing the outlet of the grass discharge passage 21 can prevent the dislocation of the plug member 180.

Now, the configuration of the housing 11 and the scroll portion 11d will be described with reference to FIGS. 18 and 19.

The scroll portion 11d according to the second embodiment is a space enclosed with the top plate 11a, an outer tubular portion 11b, and a scroll-shaped inner wall 11e formed radially outward of an inner tubular portion 11c, and connected to the passage opening 24 facing the housing 11 of the grass discharge passage 21.

The housing 11 has the scroll portion 11d in a scroll shape connected to the passage opening 24 of the grass discharge passage 21 extending rearward and upward. The top plate 11a is thus formed higher in level as extending in a spiraling direction of the scroll portion 11d (in the direction of hollow arrows Rc in FIG. 18), that is, formed deeper rearward of the paper of FIG. 18.

In other words, as shown in FIG. 18, the height of the top plate 11a of the scroll portion 11d is smallest at a scroll proximal end portion 11f, becomes larger as extending in the direction of the hollow arrows Rc, and is largest at a portion connected to the passage opening 24.

In this embodiment, a portion extending from the scroll proximal end portion 11f in the direction of the hollow arrows Rc to be connected to the passage opening 24 is referred to as a "portion with the scroll portion." A portion extending from the portion connected to the passage opening 24 in the direction of the hollow arrows Rc to the scroll proximal end portion 11f is a "portion 11g without the scroll portion 11d."

Figure 20:
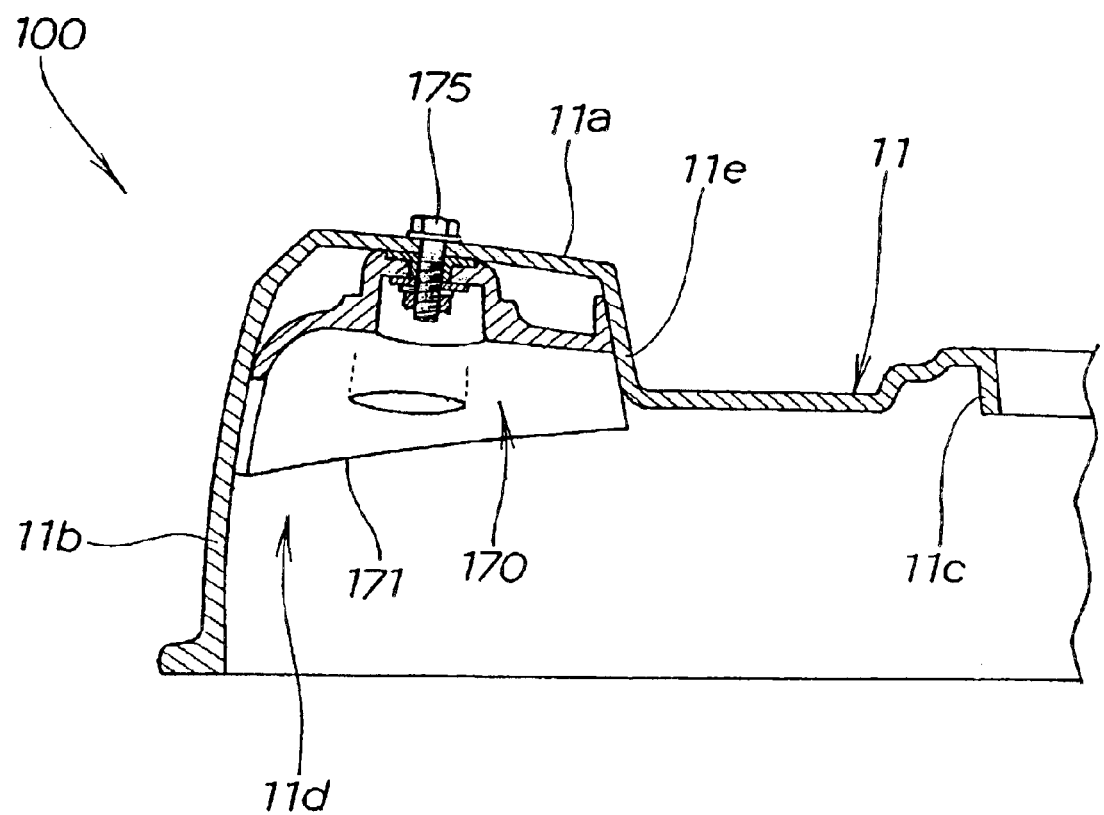
FIG. 20 is a cross-sectional view of line 20—20 in FIG. 19.

FIG. 20 illustrates that the guide 170 is secured to the housing 11 with a plurality of bolts 175.

Figure 21:
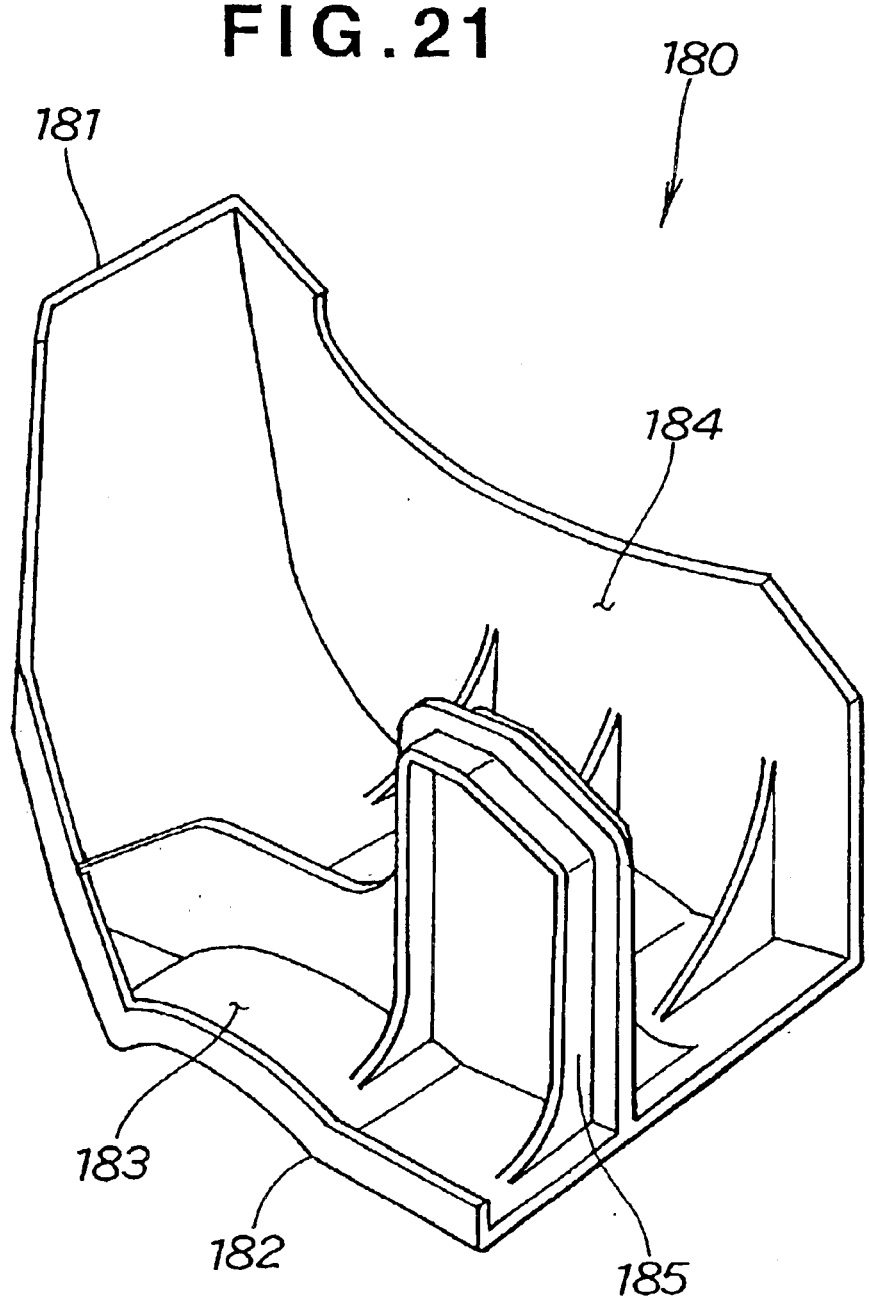
FIG. 21 is a perspective view of a plug member according to the second embodiment of the present invention.

As shown in FIG. 21, the plug member 180 is integrally formed with a bottom plate 183, a side plate 184 extending upward from one side of the bottom plate 183 and a tab 185 extending upward from a central portion of the bottom plate 183.

Now, the function of the second embodiment of the above structure will be described with reference to FIGS. 18, 19 and 22.

As shown in FIGS. 18 and 19, the lawn mower 100 of the second embodiment has the guide 170 placed along the scroll portion 11d for allowing grass clippings to swirl within the bagging-mode housing 11 while directing them toward the grass discharge passage 21, the guide 70 being provided beneath the top plate 11a of the housing 11, and the rear guide end 171 of the guide 170 being opposed to the passage opening 24, so that the direction Rc (the direction of the hollow arrows Rc) of an air flow swirling grass clippings within the housing, that is, a swirling flow can be gradually changed and guided toward the passage opening 24 with the guide 170.

Furthermore, since the guide 170 placed along the scroll 11d is provided beneath the top plate 11a of the bagging-mode housing 11, the cross-sectional area of the housing 11 can be gradually changed between the portion with the scroll portion 11d and the portion 11g without the scroll portion 11d. The gradual change of the cross-sectional area results in a gradual change of the flow velocity of a swirling flow between the portion with the scroll portion 11d and the portion 11g without the scroll portion 11d.

Thus in the mulching mode in which the grass discharge passage 21 is blocked off, a swirling flow guided by the guide 70 smoothly continues swirling within the housing 11. Grass clippings therefore hardly accumulate within the housing 11. No accumulation of grass clippings allows continuous grass cutting operations. As a result, the operating efficiency in the mulching-mode is increased. Further, grass clippings can be evenly discharged downward from the housing 11. The return amount of the grass clippings returned from the housing 11 to the lawn is thus even, improving the finished quality of grass cutting.

Figure 22:
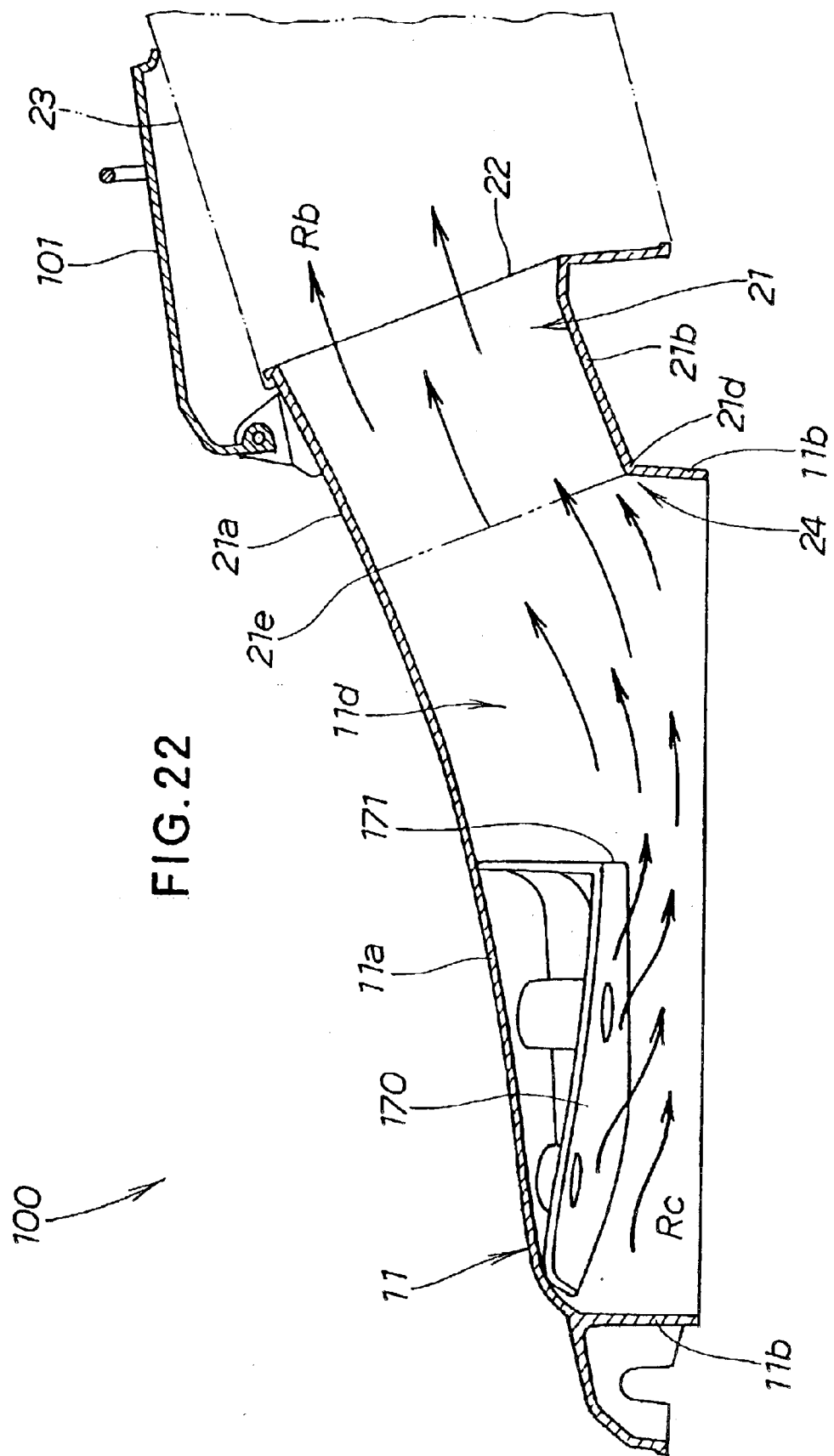
FIG. 22 is a cross-sectional view corresponding to FIG. 19, illustrating a state in a bagging mode in which a grass discharge passage is opened.

In the bagging mode with the grass discharge passage 21 opened, a swirling flow (carrying flow) guided by the guide 170 flows from the passage opening 24 into the grass discharge passage 21 to discharge grass clippings into the grass receptacle 23 as shown in FIG. 22. The operating efficiency in the bagging mode can be secured.

In this manner, the operating efficiency in the mulching mode can be improved with the operating efficiency in the bagging mode secured, improving the finished quality of grass cutting.

Further, as shown in FIGS. 18 and 19, the rear guide end 171 of the guide 170 is generally oriented toward the bottom of the passage opening 24, that is, the proximal end 21d of the bottom plate 21b, so that the flow direction Rc of a swirling flow can be gradually changed and guided below the passage opening 24. The cross-sectional area of the housing 11 can thus be more gradually changed between the portion with the scroll portion 11d and the portion 11g without the scroll portion 11d. The more gradual change in the cross-sectional area results in a more gradual change in the flow velocity of the swirling flow between the portion with the scroll portion 11d and the portion 11g without the scroll portion 11d.

As a result, in the mulching mode, a swirling flow guided by the guide 170 more smoothly continues swirling within the housing 11. Local accumulation of grass clippings within the housing 11 can thus be further prevented. More continuous grass cutting operations can thus be performed, further increasing operating efficiency in the mulching mode. Also the return mount of grass clippings returned from the housing 11 to the lawn can be more evened, further improving the finished quality of grass cutting.

Furthermore, the fact that a member for opening and closing the grass discharge passage 21 is constituted by the plug member 180 to be removed out of or inserted into the grass discharge passage 21 and the plug member 180 is extended toward the rear guide end 171 of the guide 170 within the housing 11 allows the bagging-mode housing 11 to be switched between the bagging mode and the mulching mode only by removing or inserting the plug member 180 out of or into the grass discharge passage 21. The mode switching operation is easy and allows short-time switching.

The lower end 182 of the plug member 180 extended toward the rear guide end 171 of the guide 170 is placed at a height substantially identical to that of the rear guide end 171, so that a swirling flow guided by the guide 170 passes below the plug member 180 in the mulching mode with the grass discharge passage 21 blocked by the plug member 180. In this manner, a swirling flow guided by the guide 170 can be further gradually changed and guided toward the portion 11g without the scroll portion 11d by the lower end 182 of the plug member 180.

The cross-sectional area of the housing 11 can thus be more gradually changed between the portion with the scroll portion 11d and the portion 11g without the scroll portion 11d. The more gradual change in cross-sectional area results in a more gradual change in the flow velocity of a swirling flow between the portion with the scroll portion 11d and the portion 11g without the scroll portion 11d. As a result, in the mulching mode, a swirling flow guided by the guide 170 more smoothly continues swirling within the housing 11. Grass clippings can thus be further prevented from locally accumulating within the housing 11.

In the present invention, the power source is not limited to the engine 11 and may be an electric motor, for example.

The grass receptacle 23 is not limited to a grass bag and may be a box, for example.

The vertical shield 45 and the horizontal shield 46 may have any shape, size and material as long as being configured to be able to control the degree of opening of the passage opening 24.

The shutter member 47 may have the swing proximal end of the vertical shield 45 attached to the rotary shaft 44 in any manner, including the configuration in which only the swing proximal end of the vertical shield 45 is attached to the rotary shaft 44 or only the swing proximal end of the horizontal shield 46 is attached to the rotary shaft 44, for example.

The guide 71 or 170 may have any shape, size and material.

The rear guide end 71 may have any shape and size of the depressions 71a and the projections 71b as long as being in a wave shape.

The present disclosure relates to the subject matters of Japanese Patent Application No. 2002-087057, filed Mar. 25, 2002, and Japanese Patent Application No. 2002-325846, filed Nov. 8, 2002, the disclosures of which are expressly incorporated herein by reference in their entireties.

What is claimed is:

1. A lawn mower, comprising:
 a power source for rotationally driving an output shaft;
 a housing having a front end and a rear end, the housing being disposed below the power source and opening in a downward direction with respect to the power source;

a cutting blade disposed in the housing and connected to the output shaft for rotation therewith;

an enclosure having a grass discharge passage extending rearwardly and upwardly from the housing, the grass discharge passage having an inlet facing the housing, an outlet opposite the inlet and a bottom portion;

a grass receptacle removably mounted to the housing at the outlet of the grass discharge passage;

a scroll portion disposed in the housing forwardly of the grass discharge passage for allowing grass clippings cut by the cutting blade to swirl within the housing while guiding the grass clippings to the grass discharge passage as a swirling airflow flows along the scroll portion within the housing when the cutting blade is rotating; and a guide mounted within the housing so as to extend along the scroll portion beneath a top plate of the housing for guiding the swirling airflow toward the grass discharge passage while gradually changing a direction of the swirling airflow toward the grass discharge passage, the guide being disposed forwardly of and having a rear guide end generally orientated toward the bottom portion of the inlet of the grass discharge passage and confronting the inlet of the grass discharge passage so that a space is defined between the rear guide end and the inlet of the grass discharge passage;

a shutter member disposed in the grass discharge passage for opening and closing the grass discharge passage, the shutter member comprising a plug member configured to be removed out of or inserted into the grass discharge passage, wherein when the plug member is inserted into the grass discharge passage, the plug member extends toward the rear guide end of the guide and a bottom portion of the plug member is disposed at a height substantially identical to that of the rear guide end relative to the bottom portion of the inlet of the grass discharge passage;

wherein when the grass discharge passage is opened by the shutter member, grass clippings cut by the cutting blade are guided through the grass discharge passage and into the grass receptacle; and wherein when the grass discharge passage is closed by the shutter member, grass clippings cut by the cutting blade are discharged in the downward direction.

2. A lawn mower comprising:

a power source for rotationally driving an output shaft;

a housing having a front end and a rear end and having an interior space having a generally spiral-shaped portion;

a cutting blade disposed in the interior space of the housing and connected to the output shaft for rotation therewith to cut grass while the spiral-shaped portion of the interior space generates a swirling airflow allowing the cut grass to swirl within the interior space;

an enclosure connected to the housing and having a grass discharge passage having an inlet opening disposed in communication with the interior space of the housing for discharging grass cut by the cutting blade and swirling within the interior space of the housing; and guiding means for gradually changing a direction of the swirling airflow and the swirling cut grass and for guiding the swirling airflow and the swirling cut grass toward the grass discharge passage of the enclosure, the guiding means comprising a plate member having a front end portion extending toward the front end of the housing and a rear end portion extending toward the rear end of the housing, the rear end portion of the plate member being disposed in confronting, spaced-apart relation to the inlet opening of the grass discharge passage of the enclosure, and the rear end portion of the plate member having a plurality of alternately arranged projections and depressions.

3. A lawn mower comprising:

a power source for rotationally driving an output shaft;

a housing having an outer tubular portion, an inner tubular portion, and an upper plate portion connecting the outer and inner tubular portions to one another and defining therewith an interior space having a generally spiral-shaped portion;

a cutting blade disposed in the interior space of the housing and connected to the output shaft for rotation therewith to cut grass while the spiral-shaped portion of the interior space generates a swirling airflow allowing the cut grass to swirl within the interior space;

an enclosure connected to the housing and having a grass discharge passage having an inlet opening disposed in communication with the interior space of the housing for discharging grass cut by the cutting blade and swirling within the interior space of the housing; and guiding means for gradually changing a direction of the swirling airflow and the swirling cut grass and for guiding the swirling airflow and the swirling cut grass toward the grass discharge passage of the enclosure, the guiding means comprising a plate member disposed below the upper plate portion of the housing for gradually varying a flow velocity of the swirling airflow and the swirling cut grass to prevent the cut grass from depositing locally within the interior space of the housing, a rear end portion of the plate member having a plurality of alternately arranged projections and depressions.

* * * * *